US012710798B1

(12) United States Patent
Guo et al.

(10) Patent No.: US 12,710,798 B1
(45) Date of Patent: Aug. 18, 2026

(54) POWER AND PERFORMANCE CONTROLS FOR POWERING DYNAMIC POWER LOADS WITH STATIC POWER SOURCES

(71) Applicant: Amazon Technologies, Inc., Seattle, WA (US)

(72) Inventors: Linfei Guo, San Francisco, CA (US); Sagnik Kar, San Jose, CA (US); Leonardo Lee, San Jose, CA (US); Evan Fletcher Dougal, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 18/756,696

(22) Filed: Jun. 27, 2024

(51) Int. Cl.
*G06F 1/26* (2006.01)
*G06F 1/28* (2006.01)
*G06F 13/40* (2006.01)

(52) U.S. Cl.
CPC ................ *G06F 1/266* (2013.01); *G06F 1/28* (2013.01); *G06F 13/4068* (2013.01); *G06F 2213/0042* (2013.01)

(58) Field of Classification Search
CPC .................................. G06F 1/266; G06F 1/28
See application file for complete search history.

(56) References Cited

U.S. PATENT DOCUMENTS

| | | | | |
|---|---|---|---|---|
| 2017/0060158 | A1* | 3/2017 | Park | H02J 4/00 |
| 2018/0120908 | A1* | 5/2018 | Pilz | G06F 1/266 |
| 2019/0041938 | A1* | 2/2019 | Zupanc | G06F 1/30 |
| 2020/0382078 | A1* | 12/2020 | Hoff | H04R 3/00 |
| 2023/0387705 | A1* | 11/2023 | Lesso | H02J 7/80 |
| 2025/0096746 | A1* | 3/2025 | Khlat | H03F 3/24 |

* cited by examiner

*Primary Examiner* — Scott Bauer
(74) *Attorney, Agent, or Firm* — K&L Gates LLP

(57) ABSTRACT

Systems, apparatuses, and techniques are described for controlling an energy storage device, such as a high-voltage capacitor, using a power based current control profile. Examples are described which comprise a control circuit comprising a power management integrated circuit (PMIC) and a system power and performance control (SPC) circuit. The PMIC may detect and characterize a fixed maximum power limit for a power source. The PMIC may further regulate the transfer of power, from a power source and/or the energy storage device, to a plurality of system loads. The SPC circuit may regulate the charging and/or discharging of the energy storage device based on a power based current control profile. The charging and/or discharging of the energy storage device may be controlled by the SPC as a function of an instantaneous power-gap between the dynamic system loading power and the fixed maximum power limit detected for the power source.

20 Claims, 12 Drawing Sheets

Detect a power limit for a power source
802

Monitor a system loading power relative to the power limit
804

Monitor a capacitor voltage of a capacitor
806

Monitor a system voltage of a system voltage node
808

Determine that the system loading power is less than the power limit
810

Charge the capacitor based on a surplus power-gap
812

Determine that the capacitor voltage is equal to one or more thresholds
814

Generate one or more system signals
816

Cease charging of the capacitor
818

Determine that the system loading power is greater than the power limit
820

Discharge the capacitor based on a deficit power-gap
822

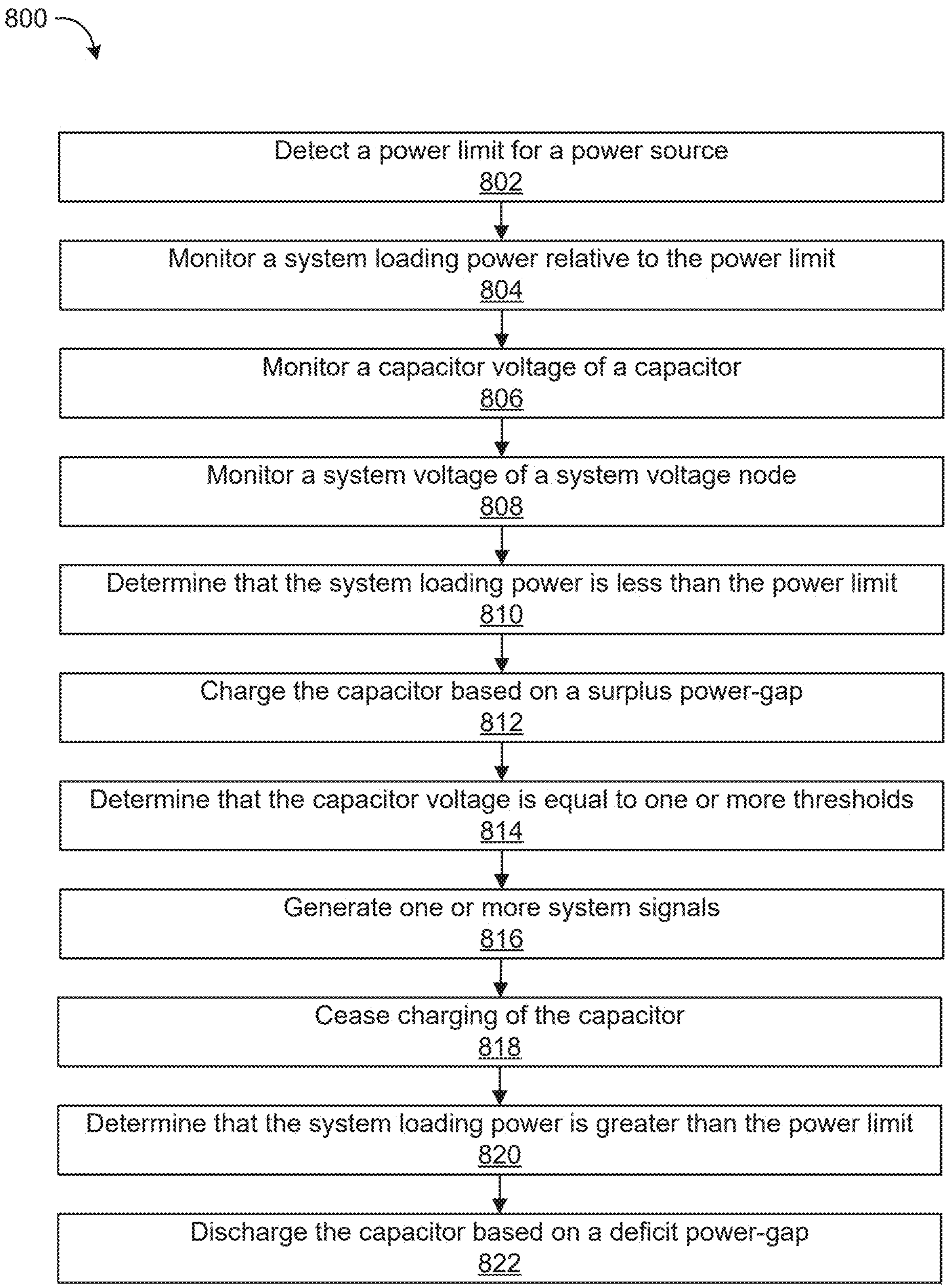

FIG. 8

POWER AND PERFORMANCE CONTROLS FOR POWERING DYNAMIC POWER LOADS WITH STATIC POWER SOURCES

BACKGROUND

The Universal Serial Bus (USB) is a standardize electrical connection that is capable of data exchange and the delivery of electrical power between electrical devices. There are various types and versions of USB specifications that each include a USB port and a corresponding USB connector. USB ports can be found on smart televisions, computers, and smart phones. Such electrical devices use their USB ports to communicate with peripheral devices equipped with USB connectors. The maximum power that can be delivered by a USB port is limited and depends on the type and version of the USB. The power required to operate electrical devices can vary based on the performance of the electrical device.

BRIEF DESCRIPTION OF DRAWINGS

FIG. 8 illustrates an example process for controlling system power and performance, in accordance with various aspects of the present disclosure.

DETAILED DESCRIPTION

Figure 1:
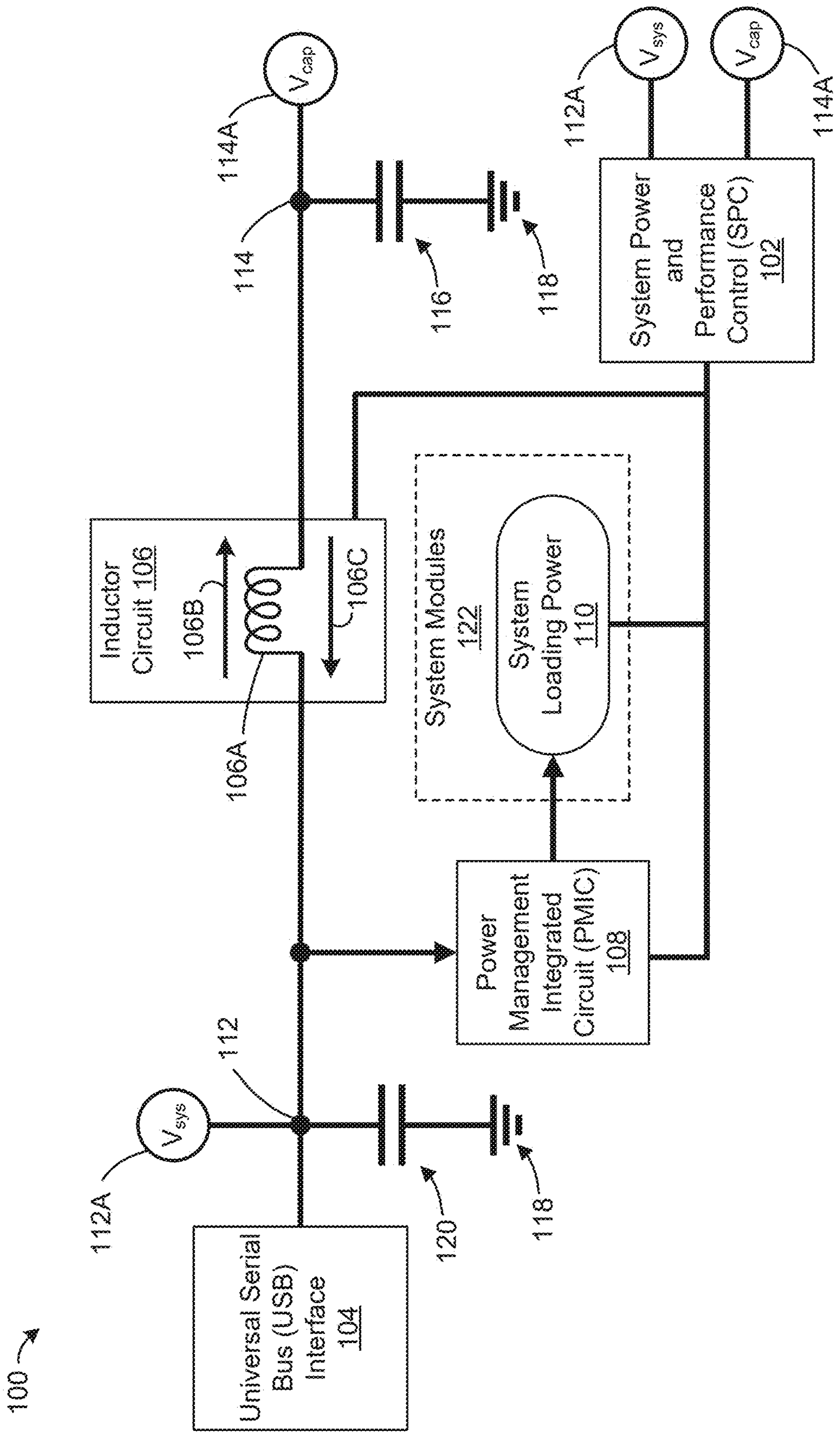
FIG. 1 illustrates an example control circuit for power and performance management, in accordance with various aspects of the present disclosure.

In the following description, reference is made to the accompanying drawings which illustrate several examples for the present disclosure. It is understood that other embodiments may be utilized and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Since its introduction, the Universal Serial Bus (USB) specification, in its various types and versions (or standards), has been widely integrated into many technologies, such as personal computers (e.g., laptop, smart phones, etc.) and home appliances (e.g., televisions, radios, etc.), in order to facilitate data exchange and/or power transfer between electronic devices. The USB specification has allowed users to augment the functionality of their electronic devices by connecting peripheral devices configured to provide additional features and capabilities. For example, televisions equipped with a USB port may allow users to connect a streaming stick, or other streaming media player (SMP) devices, to expand the televisions streaming capabilities by adding additional processing power and/or streaming applications that may not be directly supported by the base television. In addition, because the USB port can transfer power from the television to the streaming stick, the USB interface between the two devices may alleviate the need for additional dedicated power adapters (e.g., to power the streaming stick separately from the television).

Unlike dedicated power adapters which can be configured with power capabilities tailored to an electronic devices specific requirements, a USB port has a fixed power capacity that depends on the particular type and version (or standard) of the USB port specification. For example, a USB 2.0 Type-A or Type-B port may only provide a maximum power of 2.5 W (e.g., 5V at 0.5A), while a USB 3.0, 3.1, or 3.2, Type-A or Type-B may provide a maximum power of 4.5 W (e.g., 5V at 0.9A). In addition, the host electronic device may further limit the maximum power available from the USB port, for example, a particular brand or model of television may restrict a USB 3.0 Type-A port (or the like) to only 3.5 W or 4.0 W (or another number). It will be understood that these numbers may be approximations and the maximum power of a USB port may further vary by a ±10% tolerance (or another number). Accordingly, to ensure proper functionality (e.g., with limited or full device performance), the power consumption of an electronic device utilizing a USB port as its main power source must never exceed the maximum power of that particular USB port. Exceeding the maximum power limit of the USB port may result in a device brown-out and/or a system reboot leading to an undesirable user experience. For example, a streaming stick brown-out may cause a movie or live broadcast to cutout mid-stream.

Traditionally, it has been difficult for onboard power management systems of electronic devices to properly characterize (or detect) the maximum power capacity of a respective USB port (or other power source) because of the variety of factors (as described above) which may limit the maximum power output. It has also traditionally been difficult for onboard power management systems to properly power electronic devices (e.g., streaming sticks, etc.) with dynamic power requirements because of the maximum power limit inherent in USB ports (or other power sources). Many electronic devices typically exhibit dynamic power consumption that may instantaneously increase or decrease, for example, based on usage of the central processing unit (CPU), graphics processing unit (GPU), memory usage, and/or other system module. For example, during operation of a streaming stick (e.g., to stream a video, etc.), there may be peaks of relatively high power consumption over relatively short periods of time that are interspersed with longer periods of relatively low or moderate power consumption.

For instance, an electronic device may exhibit an average power consumption of 1.0 W over a period of typical operation. In such instances, the electronic device may mostly consume power equal to, or less than, 1.0 W but may periodically experience peaks in power consumption which exceed 4.5 W (or another number). This type of power consumption pattern is characteristic of many streaming sticks (e.g., that may require more power to play or buffer higher resolution content). For example, even if the average power consumption of the streaming stick falls below the maximum power limit of the USB port, the existence of transient power peaks (e.g., during heavy CPU usage, GPU usage, or the like) may surpass the maximum power limit and cause the streaming stick to brown-out and/or reboot. In addition, there has typically been no way to manage such transient power peaks that surpass the maximum power limit of USB ports (or other power sources) without using a traditional dedicated power adapter or traditional energy storage circuit designs.

Traditional dedicated power adapters have many drawbacks including increasing the costs associated with electronic devices (e.g., to manufacture, ship, recycle, etc.). Additionally or alternatively, traditional dedicated power adapters require additional power outlets that may not be available at the intended usage location (e.g., when a television is mounted above a fireplace or high on a wall). Further, traditional dedicated power adapters increase the physical footprint of the electronic device which may make installation more difficult and/or prevent usage of the electronic device entirely in instances where space is limited (e.g., in cabinets, behind televisions, on wall mounts, etc.). Additionally or alternatively, traditional dedicated power adapters create additional electronic waste (e-waste) because they can usually only operate with their intended electronic device and when the electronic device is obsolete, or broken, they may not be reusable for other electronic devices.

Figure 5:
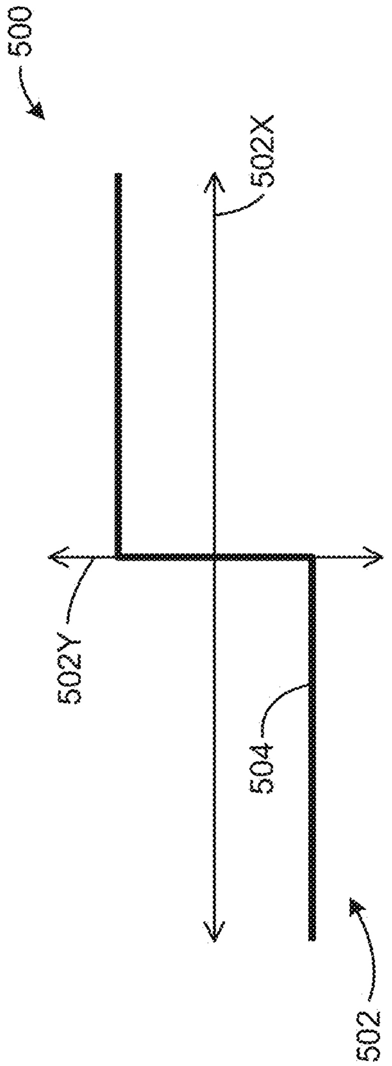
FIG. 5 illustrates a traditional voltage based fixed current control profile.
Figure 6:
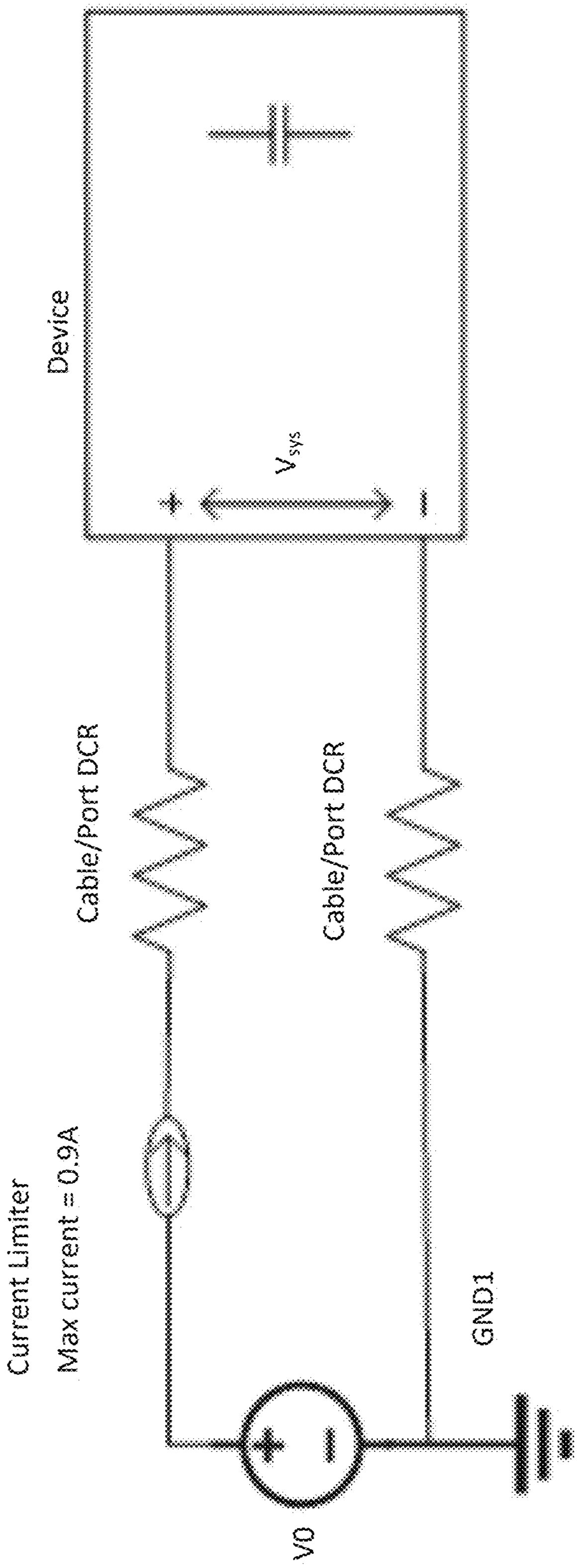
FIG. 6 illustrates a traditional fixed current circuit diagram.

Traditional energy storage circuit designs use a fixed current circuit (as shown in FIG. 6) and/or a traditional voltage based fixed current control profile (as shown in FIG. 5). Such traditional designs may be restricted to use case(s) with accurately regulated power environments, such as, with a fixed zero-load voltage and/or a defined voltage drooping condition, which may not be the case for some electronic device applications (e.g., with some television and streaming stick combinations). Additionally or alternatively, voltage may not be a good proxy (or indicator) for how much power is available from a USB port (or other power source) at any given time because there is no direct mapping between voltage and available power. Further, because there is no direct mapping between voltage and available power, it has traditionally been difficult to identify optimal voltage thresholds for initiating charging and/or discharging of energy storage devices. Moreover, traditional voltage based fixed current control profiles may discharge more power from energy storage devices than is actually required to power an electronic device because voltage does not always accurately correlate with instant power demands. This disconnect between voltage and power may waste stored power and cause traditional energy storage circuits to consume more power to compensate (e.g., by recharging for longer periods and/or more frequently). Additionally or alternatively, because traditional energy storage circuit designs rely on traditional voltage based fixed current control profiles there has traditionally been no way, and/or no need, for traditional power management systems of such electronic devices to characterize (or detect) the maximum power capacity of a respective USB port (or other power source).

In contrast to the traditional systems and techniques (or lack thereof) described above, for characterizing the maximum power capacities for power sources and/or managing dynamic power requirements for electronic devices, various systems and processes described herein may detect a power capacity of a power source (e.g., a USB port, outlet, battery, and/or any other power source with a maximum power limit) during electronic device startup and/or compensate for instantaneous power-gaps between transient power peaks generated by an electronic device (e.g., a streaming stick, etc.) and the maximum power capacity of the power source. Various systems and processes described herein may implement power based dynamic current control techniques which control current for charging and/or discharging energy storage devices based on the instantaneous power-gap (or difference) between the power demand of an electronic device and the maximum power capacity of a power source. Accordingly, various systems and processes described herein provide improvements over traditional systems by detecting the maximum power capacity of a power source as soon as an electronic device is connected and receives power.

There are many advantages of the various systems and processes described herein. One advantage is that the detection of a maximum power capacity by an electronic device allows the power management systems of the electronic device to take appropriate actions based on the available power. For example, a streaming stick may alert a user of potential issues with the power capacity of a television and/or configure the settings of the electronic device to prevent or limit such issues (e.g., by throttling the CPU, GPU, or the like, to stay within the maximum power limit, etc.).

Additionally or alternatively, various systems and processes described herein provide improvements over traditional systems by charging and/or discharging an energy storage device (e.g., a high-voltage capacitor, etc.) using a power based dynamic current control profile (as described below in connection with FIG. 4). An advantage of such systems and processes is that they can charge and/or discharge an energy storage device based on the instantaneous power-gap between a system load and the maximum power capacity of a power source. This may allow charging and/or discharging to occur based on power needs of the electronic device and may help prevent power loss (or waste) due to over discharging. In such examples, the current flowing to, or from, the energy storage device is a function of the instant excess power available from the power source and/or the instant power deficit caused by transient power peaks exceeding the maximum power capacity of the power source. For example, when there is a small amount of excess power available from the power source, a relatively small current may charge the energy storage device. Further, when there is a large power deficit caused by transient power peaks exceeding the maximum power capacity, a relatively large current may discharge from the energy storage device to assist in powering the electronic device.

Another advantage associated with systems and processes as described herein that utilize a high-voltage capacitor (e.g., 20V or another number) as the energy storage device, over traditional lower voltage capacitors (e.g., 5V or another number), is that a high-voltage capacitor can achieve the same (or similar) power capacity as a bank of multiple lower voltage capacitors. For example, a 20V high-voltage capacitor may store 16-times more power compared to a 5V capacitor. It should be appreciated that this results in meaningfully lower costs to manufacture electronic devices (e.g., less components, less assembly time, etc.), reduces the overall size of the energy storage circuit (e.g., smaller circuit due to less components, less electrical connections, etc., which may be beneficial in electronic devices where space is limited), and reduces the amount of e-waste compared to traditional energy storage circuit designs.

Additionally or alternatively, various systems and processes described herein provide improvements over traditional systems by monitoring the power level of an energy storage device (e.g., a high-voltage capacitor, etc.). Such monitoring processes, as described herein, may allow the electronic device to react to changes in the available power level of the energy storage device in order to prevent undesirable user experiences (e.g., brown-out, system reboots, etc.). For example, a streaming stick may (at least temporarily) deactivate Wi-Fi connectivity to reduce power consumption when the power level of the energy storage device is below a minimum threshold. Additionally or alternatively, the streaming stick may throttle (e.g., reduce performance using dynamic frequency scaling processes) the CPU or GPU to reduce power consumption while the energy storage device charges. In some examples, when the power consumption rate stabilizes at a sustainable level, and/or the energy storage device is once again able to provide sufficient power, then the electronic device may reactivate (or restore performance for) one or more system modules (e.g., Wi-Fi circuit, CPU, GPU, etc.).

Moreover, it should be appreciated that various systems and processes described herein solve particular technical problems, such as those identified and described above for traditional energy storage circuit designs and/or systems. For instance, because various systems and processes described herein can detect the maximum capacity of a television's USB port during booting of a streaming stick, the streaming stick can be configured prior to startup to operate within the respective power limits of a particular television and, thus, may operate with a wide variety of television brands and/or models without the need for an additional power adaptor. It will be appreciated that the scope of the present disclosure encompasses many potential examples in addition to those described above, some of which will be described in further detail below.

Examples of the architecture and componentry for example control circuits will now be described below with reference to FIG. 1.

Figure 7:
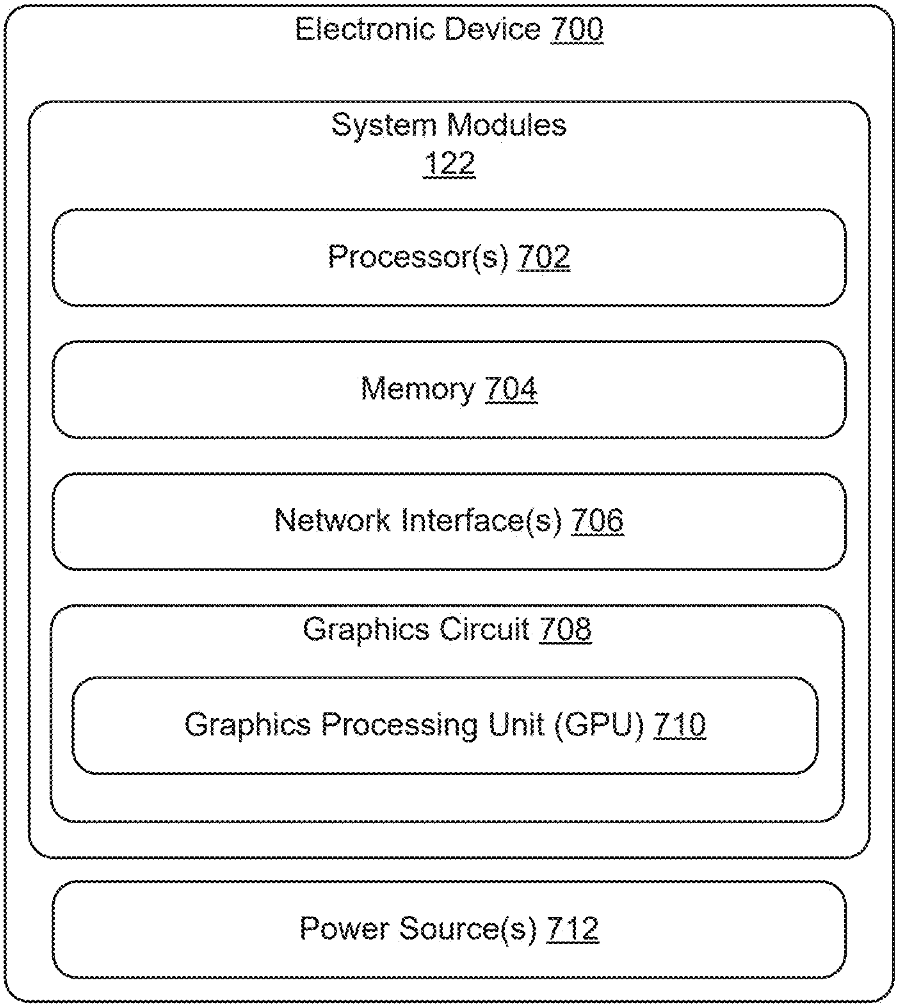
FIG. 7 illustrates a block diagram of an example electronic device, in accordance with various aspects of the present disclosure.

FIG. 1 illustrates an example control circuit 100 for managing the power and performance of an electronic device (e.g., electronic device 700 as shown in FIG. 7), in accordance with various aspects of the present disclosure. As shown in FIG. 1, the control circuit 100 may comprise a System and Performance Control (SPC) 102, a Universal Serial Bus (USB) interface 104, an inductor circuit 106, a Power Management Integrated Circuit (PMIC) 108, a system voltage node 112, a capacitor voltage node 114, a high-voltage capacitor 116, at least one ground component 118, and at least one capacitor 120. In some examples, the control circuit 100 may be communicatively coupled to one or more system modules 122 which are described in further detail below in connection with FIG. 7. It will be understood that while the example control circuit illustrated in FIG. 1 includes various connections to ground component 118, in some implementations such connections may instead be made to lower potential nodes (such as nodes having lower voltages and/or negative voltages), in accordance with the desired implementation. In some examples, the control circuit 100 may further comprise, at least in part, the power characterization circuit 900 described below in connection with FIG. 9.

The SPC 102 may comprise a dedicated integrated circuit (e.g., a System on a Chip (SoC), etc.) configured to monitor the system voltage ($V_{sys}$) 112A of the system voltage node 112 and/or the capacitor voltage ($V_{cap}$) 114A of the capacitor voltage node 114. The SPC 102 may be further configured to detect (or generate) various threshold and/or power level signals to initiate one or more corrective actions as described in further detail below in connection with FIG. 3. As shown, the SPC 102 may be communicatively coupled to the PMIC 108 in order to exchange data signals. For example, the PMIC 108 (and/or the like as described below in connection with FIG. 9) may determine a maximum power limit (or capacity) of the USB interface 104 (as described in further detail below in connection with FIGS. 9-13) and the PMIC 108 may transmit this information to the SPC 102 (e.g., to set and/or monitor one or more thresholds or power limits relative to the respective maximum power capacity). In some examples, the SPC 102 may comprise hardware (e.g., field-programmable gate arrays (FPGAs), application-specific integrated circuits (ASICs), etc.), software (e.g., executable program code, etc.), firmware (e.g., Basic Input/Output System (BIOS), etc.), and/or the like as described herein to perform one or more operations as described in further detail below in connection with FIGS. 2, 3, and/or 8.

As shown, the SPC 102 may be further communicatively coupled to one or more system modules in order to monitor and/or control the system loading power 110. In some examples, the system loading power 110 may comprise the power drawn by one or more of the system modules 122 (as described below in connection with FIG. 7) to perform one or more functions. For example, a CPU and/or GPU may draw more or less power as a function of (or in proportion to) the number of processes being executed. Similarly, a Bluetooth circuit and/or Wi-Fi circuit may draw more or less power as a function of (or in proportion to) the amount of data transmitted and/or received. In some examples, the SPC 102 may transmit control signals to the system modules 122 to activate, deactivate, adjust the performance of at least one of the system modules 122, and/or initiate one or more corrective actions as described below in connection with FIG. 3 and/or FIG. 13. In other examples, the SPC 102 may transmit control signals to the PMIC 108 and the PMIC 108 may activate, deactivate, adjust the performance of at least one of the system modules 122, and/or initiate one or more corrective actions as described below in connection with FIG. 3 and/or FIG. 13.

The USB interface 104, as shown, may comprise one or more of a USB connector, a USB cable, and/or a USB port. For example, the control circuit 100 may be integrated into an electronic device (e.g., electronic device 700 described below in connection with FIG. 7) which includes a USB cable and/or a USB connector configured to receive power from (and/or transfer data with) a compatible USB port. The USB interface 104 may comprise any USB standard and/or any USB type (e.g., with a maximum power limit or capacity). For example, the USB interface 104 may comprise any USB standard including, without limitation, USB 1.0, 2.0, 3.0, 3.1, 3.2, USB4, USB4 2.0, and/or the like. The USB interface 104 may further comprise any USB type including, without limitation, Type-A, Type-B, Type-C, Mini-USB, Micro-USB, and/or the like. In some examples, the USB interface 104 may comprise a power supply (or source) other than, or in addition to, a USB specification. In such examples, the power supply (or source) may comprise one or more of a battery (e.g., single use or rechargeable), a power grid (e.g., electrical socket, public grid, microgrid, etc.), a solar panel, a transformer, and/or any other electrical power source (e.g., with a maximum power limit or capacity) configured to power an electronic device (e.g., electronic device 700).

The inductor circuit 106, as shown, comprises an inductor 106A configured to control the current between the system voltage node 112 (e.g., input voltage node) and the capacitor voltage node 114. In some examples, the inductor circuit 106 may further comprise a switch, relay, resistor, a connection to ground component 118, and/or any other electrical components for controlling the current between the system voltage node 112 and the capacitor voltage node 114 as described herein. For example the inductor circuit 106 may further comprise a transistor (or the like) for controlling (or switching) the direction of the current. In some examples, a transistor may comprise one or more of a bipolar junction transistor (BJT), metal oxide semiconductor field effect transistor (MOSFET), P-channel transistor, N-channel transistor, and/or the like. As shown, the current through the inductor circuit 106 may flow from system voltage node 112 to the capacitor voltage node 114 (as represented by the arrow 106B) and/or from the capacitor voltage node 114 to the system voltage node 112 (as represented by the arrow 106C). As shown, the SPC 102 may be communicatively coupled to the inductor circuit 106 to control (or regulate) the current through the inductor circuit 106. For example, the SPC 102 may be communicatively coupled to one or more transistors, relays, switches, and/or the like of the inductor circuit 106 and the SPC 102 may transmit command signals to control the direction and/or magnitude of the current flow.

The Power Management Integrated Circuit (PMIC) 108, as shown, may comprise an integrated circuit (e.g., a System on a Chip (SoC), etc.) configured, at least in part, to control the flow of electrical power to operate an electronic device (e.g., electronic device 700). For example, the PMIC 108 may enable (or activate) and/or disable (or deactivate) one or more of the system modules 122 (e.g., by cutting off, or reducing, power to a respective system module). Further, the PMIC 108 may reduce the performance of one or more of the system modules 122 (e.g., by reducing power to a respective system module). The PMIC 108 may comprise (and/or be coupled to) one or more of a transistor (as described above), resistor, capacitor (as described below), comparator, converter, finite state machine (FSM), and/or any other components described in further detail below in connection with FIG. 9. In some examples, the PMIC 108 may comprise hardware (e.g., field-programmable gate arrays (FPGAs), application-specific integrated circuits (ASICs), etc.), software (e.g., executable program code, etc.), firmware (e.g., Basic Input/Output System (BIOS), etc.), and/or the like as described herein to perform one or more operations as described in further detail below in connection with FIGS. 3, 8, 10, 11, 12, and/or 13. In some examples, the SPC 102 may comprise, at least in part, the PMIC 108. For example, the SPC 102 and the PMIC 108 may comprise a single circuit, SoC, and/or the like as described herein.

Figure 9:
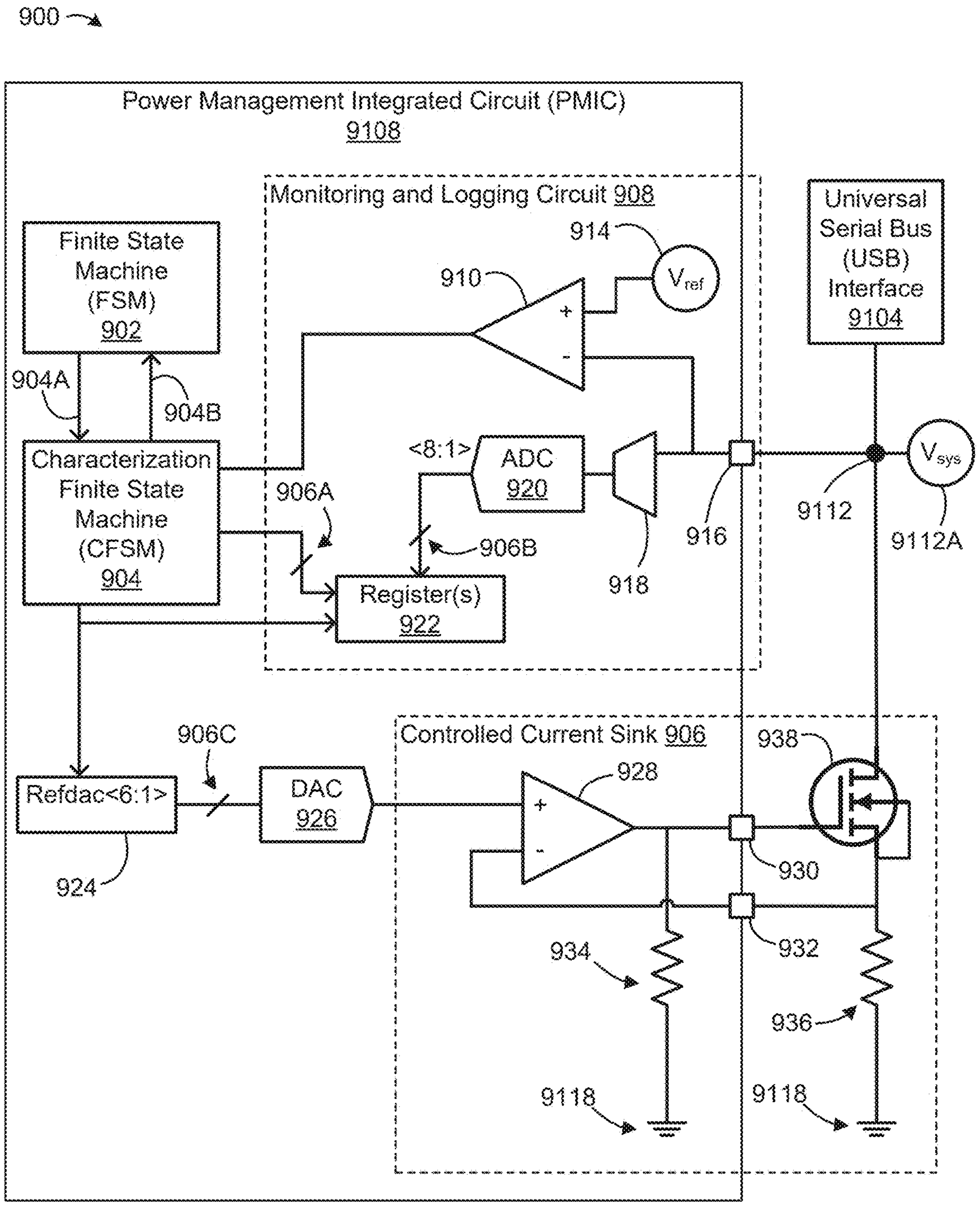
FIG. 9 illustrates an example power characterization circuit for characterizing a power source, in accordance with various aspects of the present disclosure.

It will be understood that some electrical circuit nodes (as shown in FIGS. 1 and 9) are illustrated as circular nodes, this is done for illustrative purposes and to facilitate clearer description of the examples described herein. It will be understood that a "node" or "electrical node" includes any or all regions on a circuit directly between two or more circuit components (e.g., a portion of the circuit sharing the same electrical potential).

The system voltage node 112, as shown, may comprise any or all regions on the control circuit 100 coupling the USB interface 104, the SPC 102, the capacitor 120, the PMIC 108, and the inductor circuit 106. In some examples, the system voltage node 112 may comprise a point (or location) in the control circuit 100 from which the system voltage ($V_{sys}$) 112A (e.g., an input voltage (Vin)) may be determined (e.g., measured by SPC 102, a voltage meter, and/or similar electrical instrumentation). In some examples, the system voltage ($V_{sys}$) 112A may represent an electrical connection (e.g., a direct connection and/or an indirect connection as described herein) between the system voltage node 112 and at least the SPC 102. In some such examples, the system voltage ($V_{sys}$) 112A may further represent a voltage meter and/or similar electrical instrumentation for measuring and/or monitoring the voltage of the system voltage node 112. In such examples, any voltage meter and/or similar electrical instrumentation may transmit any or all voltage measurements to at least the SPC 102.

The capacitor voltage node 114, as shown, may comprise any or all regions on the control circuit 100 coupling the SPC 102, the high-voltage capacitor 116, and the inductor circuit 106. In some examples, the capacitor voltage node 114 may comprise a point (or location) in the control circuit 100 from which the capacitor voltage ($V_{cap}$) 114A (e.g., representative of a charge, or power level, stored in the high-voltage capacitor 116) may be determined (e.g., measured by SPC 102, a voltage meter, and/or similar electrical instrumentation). In some examples, the capacitor voltage ($V_{cap}$) 114A may represent an electrical connection (e.g., a direct connection and/or an indirect connection as described herein) between the capacitor voltage node 114 and at least the SPC 102. In some such examples, the capacitor voltage ($V_{cap}$) 114A may further represent a voltage meter and/or similar electrical instrumentation for measuring and/or monitoring the voltage of the capacitor voltage node 114. In such examples, any voltage meter and/or similar electrical instrumentation may transmit any or all voltage measurements to at least the SPC 102. In some examples, the voltage meter (and/or similar electrical instrumentation) that monitors the system voltage node 112 may also monitor the capacitor voltage node 114.

The high-voltage capacitor 116, as shown, may comprise one or more capacitors (e.g., rated for 20V or another number) and may be configured to store excess power when the system loading power is below the maximum power limit of the USB interface 104 and/or discharge stored power when the system loading power is above the maximum power limit of the USB interface 104. In some examples, the high-voltage capacitor 116 may comprise one or more of a fixed capacitor, polarized capacitor, non-polarized capacitor, a variable capacitor, electrolytic capacitor, film capacitor, niobium electrolytic capacitor, glass capacitor, tantalum capacitor, silver mica capacitor, super capacitor, trimmer capacitor, ceramic capacitor, paper capacitor, and/or any other capacitor or combination of capacitors (e.g., a capacitor bank, etc.) desired for an implementation described herein. In some examples, the high-voltage capacitor 116 may comprise one or more non-capacitor based energy storage devices, such as a battery (e.g., rechargeable battery, lithium-ion battery, etc.). The capacitor 120 may comprise a low-voltage capacitor, such as a 5V capacitor, and/or any other capacitor as described above. In other examples, the capacitor 120 may be the same as, or similar to, the high-voltage capacitor 116.

The ground component 118, as shown, may comprise one or more of a USB ground pin of the USB interface 104, a negative terminal of a battery, a frame of an electronic device (e.g., a case or housing of a television), an electrical socket grounding wire, an earthing electrode, the Earth, and/or any other electrical grounding used for electrical potential reference and/or for electrical shock mitigation. For example, a streaming stick may be grounded to an electrical socket grounding wire via a ground pin of a USB port of a television that is coupled to the electrical socket.

Now that examples of the architecture and componentry for the control circuit 100 have been described above with reference to at least FIG. 1, the example waveform graphs 200 representative of dynamic and static power levels and corresponding system response signals will now be described below with reference to FIG. 2.

Figure 2:
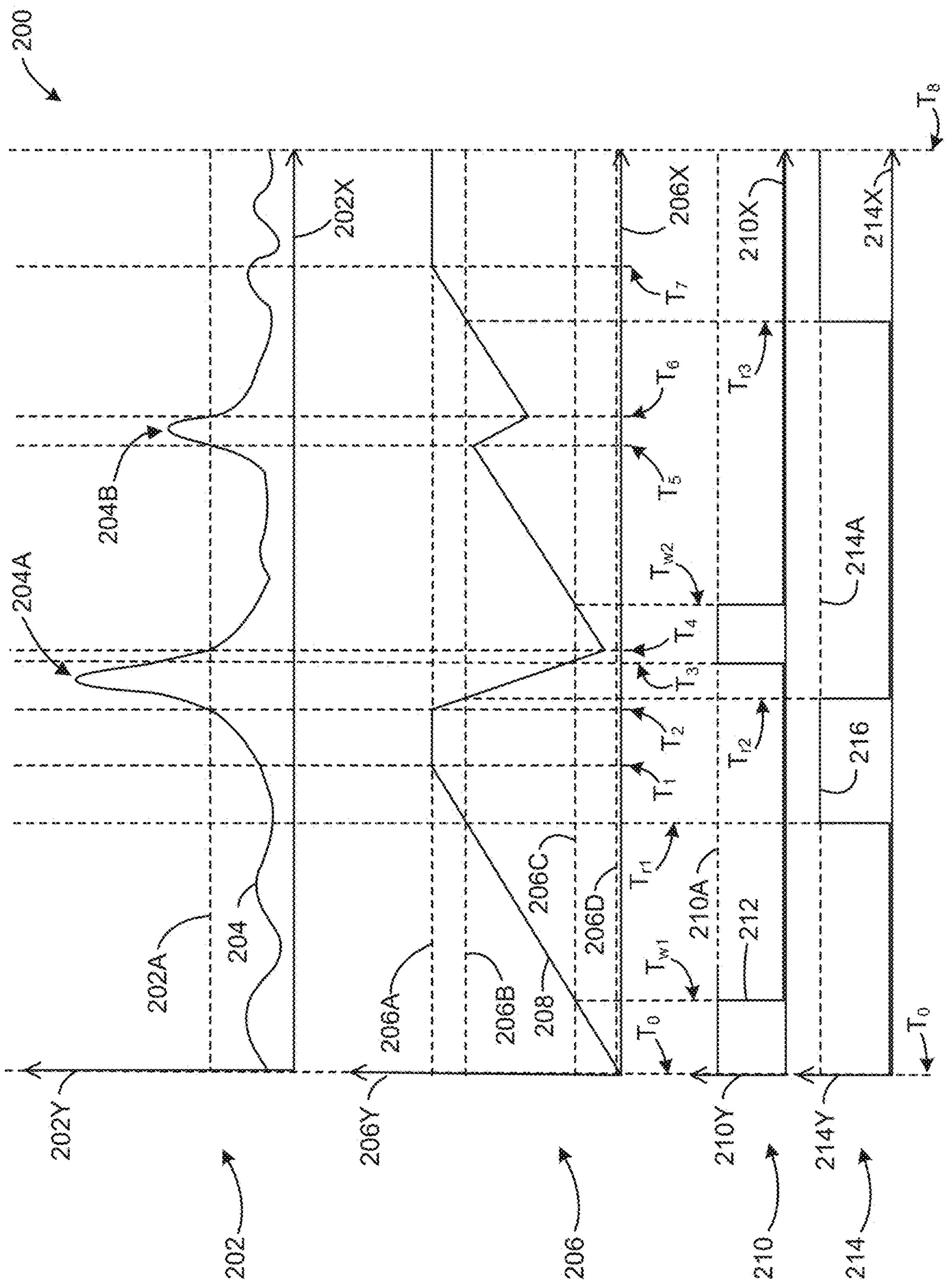
FIG. 2 illustrates example waveforms for dynamic and static power levels and corresponding system responses, in accordance with various aspects of the present disclosure.

FIG. 2 illustrates example waveforms for dynamic and static power (or energy) levels of the control circuit 100 and corresponding system response signals of the SPC 102, in accordance with various aspects of the present disclosure. As shown, FIG. 2 illustrates a plurality of waveform graphs 200. The waveform graphs 200 are examples of a system loading power graph 202, an energy storage graph 206, a warning signal graph 210, and a ready signal graph 214. As shown, the system loading power graph 202, the energy storage graph 206, the warning signal graph 210, and the ready signal graph 214 are each representative of a respective waveform of the control circuit 100 during the same time interval (between $T_0$ to $T_8$) for a non-limiting example implementation and/or use-case scenario.

It will be understood that the time markers from $T_0$ to $T_8$ (or any other time markers described herein) may represent any example length of time (e.g., 8 seconds, 30 seconds, 5 minutes, etc.). Further, the illustrated time markers (e.g., $T_1$, $T_{r1}$, $T_{w2}$, $T_5$, and/or the like) are positioned for illustrative purposes and to facilitate clearer description of the example graphical scenarios. Accordingly, the time markers should not be interpreted as representing the passage of a single amount of time unless specifically stated otherwise for a given example or otherwise understood within the context of a given example. For example, the time elapsed between $T_0$ and $T_5$ should not be interpreted to represent 5 seconds (or any other number) unless specifically stated otherwise, or otherwise understood within the context as used.

The system loading power graph 202, as shown, comprises a Y-axis 202Y and an X-axis 202X. The Y-axis 202Y, as shown, represents an amplitude of a system loading power signal (e.g., indicating the system loading power 110), such as in Watts or any other unit of power. The X-axis 202X, as shown, represents a time interval (or period), such as in seconds or any other unit of time. As shown, the X-axis 202X begins at $T_0$ and ends at $T_8$. The system loading power graph 202, as shown, may further comprise a maximum power limit 202A and a system loading power line 204. The maximum power limit 202A may represent (or indicate) a maximum power capacity for the USB interface 104 of control circuit 100 and/or any other power source that can provide power to the control circuit 100 as described herein. In some examples, the maximum power limit 202A may be equal to a maximum power of 2.5 W, 4.5 W, or any other number associated with a USB specification (or other power source) to within a ±10% tolerance. The system loading power line 204 may represent (or indicate) the system loading power 110 of control circuit 100 (or the like) at any given time between $T_0$ and $T_8$. As shown, the system loading power line 204 may comprise a power peak 204A and power peak 204B. The power peak 204A and the power peak 204B may represent transient power peaks in the system loading power 110 (e.g., during startup, during power intensive operations, etc.).

The energy storage graph 206, as shown, comprises a Y-axis 206Y and an X-axis 206X. The Y-axis 206Y, as shown, represents an amount of energy (e.g., electricity, voltage, power, etc.) stored by the high-voltage capacitor 116 and/or any other energy storage device described herein. The X-axis 206X, as shown, represents a time interval (or period), such as in seconds or any other unit of time. As shown, the X-axis 206X begins at $T_0$ and ends at $T_8$. The energy storage graph 206, as shown, may further comprise a maximum energy threshold 206A, ready threshold 206B, a warning threshold 206C, an alarm threshold 206D, and an energy storage line 208. The maximum energy threshold 206A may represent (or indicate) a maximum energy capacity for the high-voltage capacitor 116 of control circuit 100 (and/or any other energy storage device described herein). The ready threshold 206B may represent (or indicate) a minimum energy capacity necessary for the high-voltage capacitor 116 of control circuit 100 (and/or any other energy storage device described herein) to discharge current to compensate for transient power peaks (e.g., power peak 204A and/or power peak 204B of system loading power graph 202) that exceed a maximum power limit of a power source (e.g., the maximum power limit 202A of system loading power graph 202). The warning threshold 206C may represent (or indicate) a low energy capacity (of the high-voltage capacitor 116 or the like) that triggers activation of a warning signal (e.g., warning signal 306 described in connection with FIG. 3) when the energy storage line 208 is less than the warning threshold 206C. The alarm threshold 206D may represent (or indicate) a depleted, or nearly depleted, energy capacity (for the high-voltage capacitor 116 or the like) that triggers activation of an alarm signal (e.g., alarm signal 308 described in connection with FIG. 3) when the energy storage line 208 is less than, or equal to, the alarm threshold 206D. In some examples, the alarm threshold 206D may represent a value of zero (or another number) along the Y-axis 206Y. The energy storage line 208 may represent (or indicate) the energy stored (e.g., electricity, voltage, power, etc.) by the high-voltage capacitor 116 (or the like) at any given time between $T_0$ and $T_8$.

The warning signal graph 210, as shown, comprises a Y-axis 210Y and an X-axis 210X. The Y-axis 210Y, as shown, represents an amplitude of a signal (e.g., a voltage signal, current signal, etc.) that actuates when the warning threshold 206C is crossed by energy storage line 208 of the energy storage graph 206. The X-axis 210X, as shown, represents a time interval (or period), such as in seconds or any other unit of time. As shown, the X-axis 210X begins at $T_0$ and ends at $T_8$. The warning signal graph 210, as shown, may further comprise a high warning signal threshold 210A and a warning signal line 212. The warning signal line 212 may represent (or indicate) whether a warning signal (e.g., warning signal 306) is activated (when equal to the high warning signal threshold 210A to within a ±10% tolerance) or deactivated (when below the high warning signal threshold 210A) at any given time between $T_0$ and $T_8$.

The ready signal graph 214, as shown, comprises a Y-axis 214Y and an X-axis 214X. The Y-axis 214Y, as shown, represents an amplitude of a signal (e.g., a voltage signal, current signal, etc.) that actuates when the ready threshold 206B is crossed by energy storage line 208 of the energy storage graph 206. The X-axis 214X, as shown, represents a time interval (or period), such as in seconds or any other unit of time. As shown, the X-axis 214X begins at $T_0$ and ends at $T_8$. The ready signal graph 214, as shown, may further comprise a high ready signal threshold 214A and a ready signal line 216. The ready signal line 216 may represent (or indicate) whether a ready signal (e.g., ready signal 304) is activated (when equal to the high ready signal threshold 214A to within a ±10% tolerance) or deactivated (when below the high ready signal threshold 214A) at any given time between $T_0$ and $T_8$. While not explicitly illustrated, it will be understood that the ready signal graph 214 and/or the warning signal graph 210 may be representative of graphs for similar signal patterns such as those described below in connection with FIG. 3 (e.g., the alarm signal 308 which may be associated with the alarm threshold 206D of the energy storage graph 206).

Now that the general structure of each of the example waveform graphs 200 have been described above with reference to FIG. 2, the features of the example waveform graphs 200 that correspond to each example time marker between $T_0$ and $T_8$ will now be described below with further reference to FIG. 2.

The time between $T_0$ and $T_1$ represents an initial charging phase (or mode) for the high-voltage capacitor 116 (or the like). Starting at $T_0$, the time marker $T_0$ may represent the time when an electronic device (e.g., electronic device 700, a streaming stick, etc.) is plugged into a USB port of a television (or the like) and/or turned-on. Between $T_0$ and $T_1$, the system loading power line 204 is consistently below the maximum power limit 202A, as shown in the system loading power graph 202. While the system loading power line 204 is below the maximum power limit 202A, the high-voltage capacitor 116 (or the like) utilizes this surplus energy (or excess power) to charge until the energy storage line 208 reaches the maximum energy threshold 206A at $T_1$, as shown in the energy storage graph 206. It will be understood that this charging process prepares the device to handle future power demands that may exceed the maximum power limit of the USB port of the television. Between $T_0$ and $T_{w1}$, the energy storage line 208 is below the warning threshold 206C, as shown in the energy storage graph 206. While the energy storage line 208 is below the warning threshold 206C, the warning signal line 212 is activated, as shown in the warning signal graph 210. Once the energy storage line 208 crosses over the warning threshold 206C (shown in the energy storage graph 206), the warning signal line 212 is deactivated (shown in the warning signal graph 210). In some examples, activation of the warning signal (represented by warning signal line 212) may cause one or more corrective actions as described below in connection with FIG. 3. Between $T_0$ and $T_{r1}$, the energy storage line 208 is below the ready threshold 206B, as shown in the energy storage graph 206. While the energy storage line 208 is below the ready threshold 206B, the ready signal line 216 is deactivated, as shown in the ready signal graph 214. Once the energy storage line 208 crosses over the ready threshold 206B (shown in the energy storage graph 206), the ready signal line 216 is activated (shown in the ready signal graph 214). In some examples, the control circuit 100 may not initiate discharging of the high-voltage capacitor 116 (or the like) while the ready signal line 216 is deactivated. In some examples, activation of the ready signal (represented by ready signal line 216) may allow the control circuit 100 to execute one or more corrective actions (e.g., discharge the high-voltage capacitor or the like) as described below in connection with FIG. 3.

The time between $T_1$ and $T_2$ represents an energy holding phase (or mode) for the high-voltage capacitor 116 (or the like). As shown at $T_1$, the high-voltage capacitor 116 reaches its full charge and maintains this energy level (as shown in the energy storage graph 206) between $T_1$ and $T_2$, because the system loading power line 204 remains below the maximum power limit 202A (as shown in the system loading power graph 202) and, thus, additional system loading power is not required during this time. It will be understood that between $T_1$ and $T_2$ the high-voltage capacitor 116 enters a state of equilibrium where the maximum energy level is maintained. During this interval, the high-voltage capacitor 116 ceases to charge further, as indicated by the flattening of the energy storage line 208 along the maximum energy threshold 206A. This holding phase is critical because it ensures that there is a maximum reserve of energy available for any upcoming periods of increased power demand from the electronic device.

The time between $T_2$ and $T_3$ represents a first discharge phase (or mode) for the high-voltage capacitor 116 (or the like). During this interval, the electronic device encounters a scenario where the system loading power 110 surpasses the maximum power that the USB interface 104 (or at least the USB port of the television) can supply. As shown in the system loading power graph 202 at $T_2$, the system loading power line 204 begins to exceed the maximum power limit 202A (peaking at the power peak 204A) and, thus, additional system loading power is required to compensate for this power deficit. As further shown at $T_2$ in the energy storage graph 206, the high-voltage capacitor 116 responds (e.g., at the command of the SPC 102 and/or the PMIC 108) by discharging (or releasing) the stored energy to make up for the power deficit. It will be understood that the energy (or power) from the high-voltage capacitor 116 and the USB interface 104 are supporting the operations of the electronic device between at least $T_2$ and $T_4$. Discharging of the high-voltage capacitor 116 is represented by the downward slope (or trend) of the energy storage line 208 (shown in the energy storage graph 206) and signifies the depletion of stored energy reserves. As shown at $T_{r2}$ in the ready signal graph 214, the ready signal line 216 is again deactivated when the energy storage line 208 (shown in the energy storage graph 206) drops below the ready threshold 206B. In some examples, the high-voltage capacitor 116 may continue to discharge as shown.

The time between $T_3$ and $T_4$ represents an extended discharge phase (or mode) for the high-voltage capacitor 116 (or the like). In some examples (such as illustrated in the waveform graphs 200), the extended discharge phase may cause (or initiate) the generation of a warning signal (e.g., a dry-out warning that the energy reserve may become fully depleted if the power deficit persists). During this interval, the electronic device encounters a scenario where the system loading power 110 continues to exceed the maximum power that the USB interface 104 (or at least the USB port of the television) can supply. As shown in the system loading power graph 202 at $T_3$, the system loading power line 204 is dropping from the power peak 204A but still remains above the maximum power limit 202A and, thus, additional system loading power is still being consumed to compensate for the power deficit. Accordingly, the high-voltage capacitor 116 is still discharging energy as indicated by the downward slope (or trend) of the energy storage line 208 (shown in the energy storage graph 206) between $T_3$ and $T_4$. As shown in the energy storage graph 206 at $T_3$, the energy storage line 208 drops below the warning threshold 206C indicating that there is a risk of critical dry-out and potential energy (or power) inadequacy that may cause a brown-out for the electronic device.

As shown in the warning signal graph 210 at $T_3$, the warning signal line 212 is activated which indicates to the control circuit 100 (e.g., the SPC 102 or the like) that if the power deficit persists the extended demand placed on the energy reserves could lead to a brown-out (or power outage). In some examples, the warning signal line 212 may further indicate a period of time remaining to execute one or more corrective actions (described below in connection with FIG. 3) in order to prevent a brown-out. In some examples, the period of time may be calculated as a function of the power consumption, capacitor discharge rate, or the like. In other examples, the period of time may be predefined (e.g., based on laboratory experimentation). It will be understood that the advanced warning provided by the warning signal may allow sufficient time for the electronic device (e.g., the firmware, software and/or hardware) to respond as described herein. For example, the time-bounded real-time Operating System (OS) of the electronic device may take one or more corrective actions (described in connection with FIG. 3) to reduce the system loading power 110 (e.g., to ensure that the system will not go into a brown-out situation that may cause the electronic device to turn off or reboot).

The time between $T_4$ and $T_5$ represents a charging phase (or recharging phase or mode) for the high-voltage capacitor 116 (or the like). As shown in the system loading power graph 202 at $T_4$, the system loading power line 204 drops below the maximum power limit 202A and, thus, marks the end of the power deficit described above. During the time between $T_4$ and $T_5$, the system loading power line 204 is consistently below the maximum power limit 202A (shown in the system loading power graph 202) which allows the high-voltage capacitor 116 to initiate recharging (e.g., to restore the energy reserves). Charging of the high-voltage capacitor 116 is represented by the upward slope (or trend) of the energy storage line 208 (shown in the energy storage graph 206) and signifies that the stored energy reserves are increasing. As shown at $T_{w2}$ in the warning signal graph 210, the warning signal line 212 is again deactivated when the energy storage line 208 (shown in the energy storage graph 206) drops below the warning threshold 206C.

The time between $T_5$ and $T_6$ represents a second discharge phase (or mode) for the high-voltage capacitor 116 (or the like). As shown in the system loading power graph 202 between $T_5$ and $T_6$, the system loading power line 204 exceeds the maximum power limit 202A (peaking at the power peak 204B) and, again, additional system loading power is required to compensate for this power deficit. As further shown in the energy storage graph 206 between $T_5$ and $T_6$, the high-voltage capacitor 116 responds (e.g., at the command of the SPC 102 and/or the PMIC 108) by discharging (or releasing) the stored energy to make up for the power deficit. It will be understood that the energy (or power) from the high-voltage capacitor 116 and the USB interface 104 are supporting the operations of the electronic device between at least $T_5$ and $T_6$. Discharging of the high-voltage capacitor 116 is represented by the downward slope (or trend) of the energy storage line 208 (shown in the energy storage graph 206) and signifies the diminishing stored energy reserves. It should be appreciated that in the illustrated example, the energy storage line 208 was not required to reach the ready threshold 206B (as shown in the energy storage graph 206) before the high-voltage capacitor 116 was able to support the operations of the electronic device between at least $T_5$ and $T_6$.

The time between $T_6$ and $T_7$ represents a recovery charging phase (or mode) for the high-voltage capacitor 116 (or the like). As shown in the system loading power graph 202 at $T_6$, the system loading power line 204 drops below the maximum power limit 202A (down from power peak 204B) and, thus, marks the end of the second power deficit described above. During the time between $T_6$ and $T_7$, the system loading power line 204 is consistently below the maximum power limit 202A (shown in the system loading power graph 202) which allows the high-voltage capacitor 116 to initiate recharging (e.g., to restore the energy reserves). Charging of the high-voltage capacitor 116 is represented by the upward slope (or trend) of the energy storage line 208 (shown in the energy storage graph 206) and signifies that the stored energy reserves are increasing. As shown at $T_{r3}$ in the ready signal graph 214, the ready signal line 216 is again activated when the energy storage line 208 (shown in the energy storage graph 206) increases above the ready threshold 206B.

The time between $T_7$ and $T_8$ represents another energy holding phase (or mode) for the high-voltage capacitor 116 (or the like). As shown at $T_7$, the high-voltage capacitor 116 reaches its full charge and maintains this energy level (as shown in the energy storage graph 206) between $T_7$ and $T_8$, because the system loading power line 204 remains below the maximum power limit 202A (as shown in the system loading power graph 202) and, thus, additional system loading power is not required during this time. It will be understood that between $T_7$ and $T_8$ the high-voltage capacitor 116 enters a state of equilibrium where the maximum energy level is maintained. During this interval, the high-voltage capacitor 116 ceases to charge further, as indicated by the flattening of the energy storage line 208 along the maximum energy threshold 206A. It should be understood that during any or all of the various intervals described above, between $T_0$ and $T_8$, that the control circuit 100 (e.g., utilizing the SPC 102, the PMIC 108, and/or the like as described herein) may manage the energy levels within the high-voltage capacitor 116 (or the like) ensuring a balance between charging, maintaining, and discharging in order to maintain the uninterrupted functionality of the electronic device (e.g., electronic device 700 or the like) and to provide warnings (or alerts, alarms, etc.) whenever the energy reserves approach low levels (or any other threshold).

Now that the general structure and example time markers of each of the example waveform graphs 200 have been described above with reference to FIG. 2, example corrective actions will now be described below with reference to FIG. 3.

Figure 3:
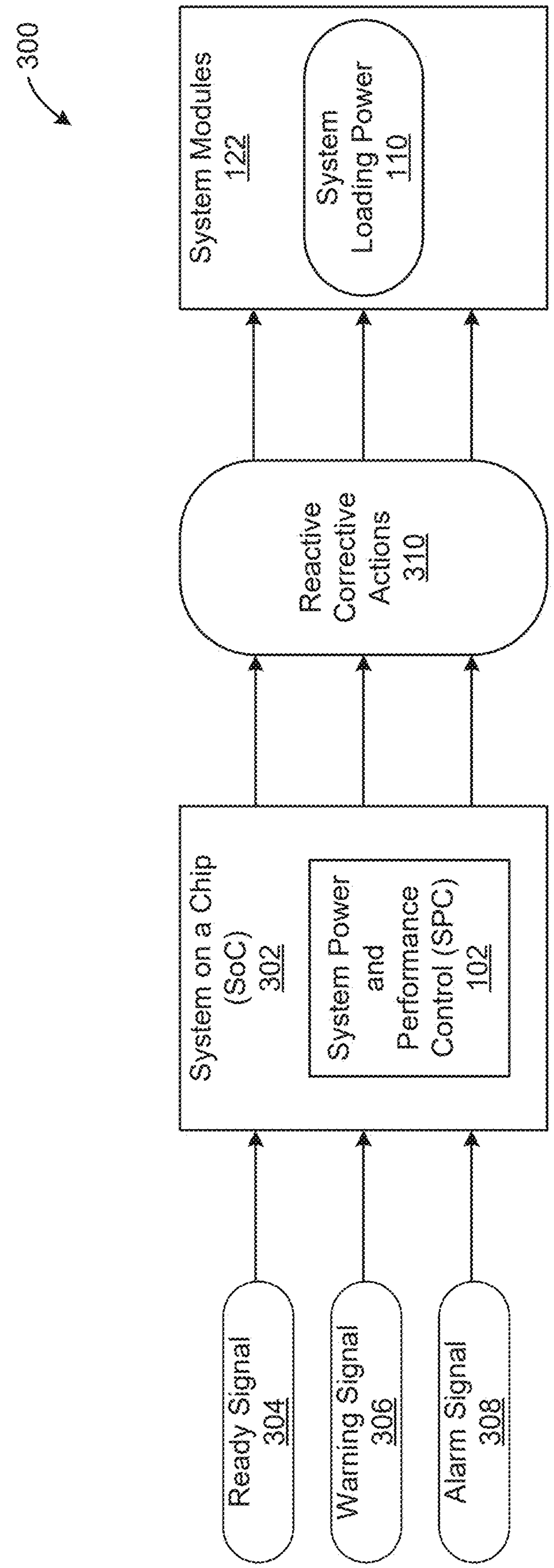
FIG. 3 illustrates an example block diagram for corrective actions, in accordance with various aspects of the present disclosure.

FIG. 3 illustrates an example block diagram 300 for executing corrective actions in response to one or more signals (e.g., generated by the control circuit 100 or the like), in accordance with various aspects of the present disclosure. As shown, a System on a Chip (SoC) 302 may comprise, at least in part, the SPC 102 (described above in connection with FIG. 1). In some examples, the SoC 302 may further comprise, at least in part, the PMIC 108 (described above in connection with FIG. 1 and below in connection with FIG. 9). In other examples, the SoC 302 may be communicatively coupled to the PMIC 108, for example, to leverage the functionality of the PMIC 108 in order to initiate (or cause) one or more of the reactive corrective actions 310.

As illustrated in FIG. 3, the SoC 302 may monitor for, and/or detect, at least one of a ready signal 304, warning signal 306, alarm signal 308, and/or the like as described herein. For example, as described above in connection with FIG. 1, the SPC 102 may be configured (e.g., with at least one of a comparator, voltmeter, and/or other instrumentation) to monitor the system voltage ($V_{sys}$) 112A of the system voltage node 112, the capacitor voltage ($V_{cap}$) 114A of the capacitor voltage node 114, the system loading power 110, the current through the inductor circuit 106, and/or the like as described herein. Further, the SPC 102 may be configured with (or set) a threshold value (or range) (e.g., the maximum energy threshold 206A, ready threshold 206B, a warning threshold 206C, and/or an alarm threshold 206D as described above in connection with FIG. 2) for at least one of a ready condition, warning condition, alarm condition, and/or the like. In some examples, at least one of the ready signal 304, warning signal 306, alarm signal 308, and/or the like may be internally generated by the SoC 302 (or the like).

The ready signal 304, as shown, may indicate that there is a sufficient energy buffer (or power surplus) built up by the energy storage device to, at least in part, support a power deficit (e.g., in the system loading power 110). In some examples, the SoC 302 may detect, receive, and/or generate a ready signal 304 when the energy storage line 208 of the energy storage graph 206 is equal to, or greater than, the ready threshold 206B (as described above in connection with FIG. 2). Further, when the SoC 302 (or the like) detects, receives, and/or generates the ready signal 304, the SoC 302 may determine that there is a sufficient energy (or power) buffer built up in at least the high-voltage capacitor 116 (and/or other energy storage device) that the SoC 302 may cause (or initiate) one or more of the reactive corrective actions 310. For example, the SoC 302 may cause the control circuit 100 to exit a charging or recharging phase (and/or a throttling mode that may reduce system performance) as part of the reactive corrective actions 310. In some examples, the SoC 302 may cause the control circuit 100 to enter an energy holding phase (or mode) (as described above in connection with FIG. 2) after exiting the charging or recharging phase (and/or the throttling mode) as part of the reactive corrective actions 310. In some examples, the SoC 302 may cause the control circuit 100 to enter a discharge phase (or mode) (as described above in connection with FIG. 2) after exiting the charging or recharging phase (and/or the throttling mode) as part of the reactive corrective actions 310. In some examples, the reactive corrective actions 310 may comprise switching the control circuit 100 between one or more phases or modes as described herein.

The warning signal 306, as shown, may indicate that there is insufficient power (e.g., from the USB interface 104 and/or other power source) to support the system loading power 110. Additionally or alternatively, the warning signal 306 may indicate that performance throttling is needed to avoid an impending brown-out and/or reboot of the electronic device (e.g., electronic device 700). In some examples, the warning signal 306 may be generated and/or the warning threshold 206C may be configured to ensure that a minimum buffering time may be guaranteed so that SoC 302 may have sufficient time to initiate one or more of the reactive corrective actions 310 (e.g., throttling the performance of, or at least partially deactivating, at least one of the system modules 122). In some examples, the SoC 302 may detect, receive, and/or generate a warning signal 306 when the energy storage line 208 of the energy storage graph 206 is equal to, or less than, the warning threshold 206C (as described above in connection with FIG. 2). Further, when the SoC 302 (or the like) detects, receives, and/or generates the warning signal 306, the SoC 302 may determine that system throttling (or additional system throttling) is necessary. For example, when the system loading power 110 exceeds the maximum power limit 202A of the USB interface 104 the SoC 302 may cause discharging of the high-voltage capacitor and may also cause the control circuit 100 to enter one or more throttling modes (e.g., reducing CPU performance, deactivating Bluetooth connectivity, and/or the like). In some examples, the reactive corrective actions 310 may comprise switching the control circuit 100 to a throttling mode, throttling one or more of the system modules 122, and/or deactivating one or more of the system modules 122 described herein (e.g., to, at least in part, reduce the system loading power 110).

The alarm signal 308, as shown, may indicate that there is insufficient power available from the USB interface 104 (and/or other power source) and the high-voltage capacitor 116 (and/or other energy storage device) to support the system loading power 110. Additionally or alternatively, the alarm signal 308 may indicate that the high-voltage capacitor 116 (and/or other energy storage device) is depleted, or nearly depleted (e.g., equal to, or less than, 5% of the total energy storage capacity to within a ±10% tolerance). In some examples, the alarm signal 308 may be generated and/or the alarm threshold 206D may be configured to ensure that a minimum buffering time may be guaranteed so that SoC 302 may have sufficient time to initiate one or more of the reactive corrective actions 310 (e.g., deactivating at least one of the system modules 122, safely turning off the electronic device 700, etc.). In some examples, the SoC 302 may detect, receive, and/or generate an alarm signal 308 when the energy storage line 208 of the energy storage graph 206 is equal to, or less than, the alarm threshold 206D (as described above in connection with FIG. 2). Further, when the SoC 302 (or the like) detects, receives, and/or generates the alarm signal 308, the SoC 302 may determine that hardware based (instead of firmware based or interrupt based) system throttling is necessary. For example, the SoC 302 may cause power to be immediately cutoff (e.g., using a transistor, relay, switch, and/or any other hardware components of the control circuit 100) to one or more of the system modules 122 upon detection of the alarm signal 308. It will be understood that firmware based system throttling may cause a gradual (or stepped) reduction of power (based on adjustments in the system firmware) to one or more of the system modules 122 and that hardware based system throttling may cause an immediate shutdown of one or more of the system modules 122. In some examples, the reactive corrective actions 310 may comprise software based system throttling (e.g., application throttling, request rate limiting, service degradation, etc.), firmware based system throttling (e.g., adjusting firmware for GPU throttling, memory device throttling, etc.), hardware based system throttling (e.g., deactivating hardware, adjusting the CPU and/or GPU clock frequency, etc.), a combination thereof, and/or the like as described herein.

Now that example corrective actions have been described above with reference to FIG. 3, an example power based dynamic current control profile will now be described below with reference to FIG. 4.

Figure 4:
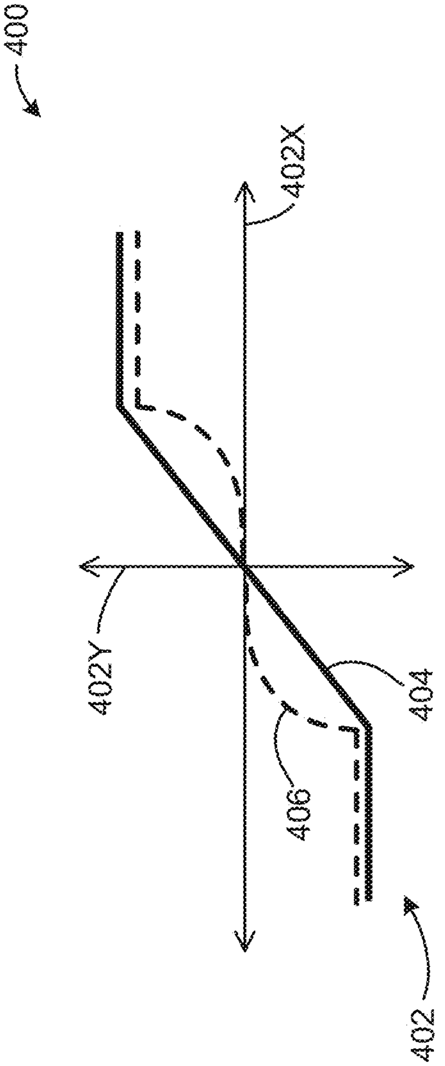
FIG. 4 illustrates an example power based dynamic current control profile, in accordance with various aspects of the present disclosure.

FIG. 4 illustrates an example power based dynamic current control profile 400, in accordance with various aspects of the present disclosure. As shown, the power based dynamic current control profile 400 is represented by the power control graph 402. The power control graph 402, as shown, comprises a Y-axis 402Y and an X-axis 402X. The Y-axis 402Y, as shown, represents an amplitude of a current and/or power signal (e.g., indicating the current through the inductor circuit 106 in relation to the dynamic current 404, and/or indicating, at least in part, the power-gap, as described above in connection with FIG. 1, in relation to the power-gap 406), such as in Amperes, Watts, and/or the like. The X-axis 402X, as shown, may represent a power threshold, such as in Watts or any other unit of power. For example, the X-axis 402X may represent the maximum power limit 202A as shown in the system loading power graph 202 and described above in connection with FIG. 2. In some examples, the X-axis 402X may further represent a voltage or voltage threshold (e.g., the system voltage ($V_{sys}$) 112A of the system voltage node 112 and/or the capacitor voltage ($V_{cap}$) 114A of the capacitor voltage node 114) which may be used as additional information for the control circuit 100. For example, the SPC 102 may monitor the system voltage ($V_{sys}$) 112A and/or the capacitor voltage ($V_{cap}$) 114A (as described above in connection with FIG. 1) to regulate or control current through the inductor circuit 106.

The power control graph 402, as shown, may further comprise a dynamic current 404 (depicted as a solid line) and a power-gap 406 (depicted as a dashed line). The dynamic current 404, as shown, represents a current level (e.g., a current direction and/or amplitude), such as the current through the inductor circuit 106 and/or the current flowing into, or out of, the high-voltage capacitor 116. The power-gap 406, as shown, represents an instantaneous power-gap (or difference) between the power demand of an electronic device (e.g., electronic device 700) and the maximum power capacity of a power source. For example, the power-gap 406 may represent, at least in part, an instantaneous power-gap (or difference) between the maximum power limit 202A and the system loading power line 204 as illustrated in the system loading power graph 202 of FIG. 2.

As shown to the left of the Y-axis 402Y, the power-gap 406 is below the X-axis 402X. In such examples, the power-gap 406 may represent a scenario when the system loading power line 204 is below the maximum power limit 202A (i.e., the USB interface 104 can supply sufficient power to satisfy the demand of the system loading power 110), such as depicted in FIG. 2 between at least $T_0$ and $T_1$. In some such examples, the dynamic current 404 may represent a charging current flowing to the high-voltage capacitor 116 (or the like).

As shown to the right of the Y-axis 402Y, the power-gap 406 is above the X-axis 402X. In such examples, the power-gap 406 may represent a scenario when the system loading power line 204 is above the maximum power limit 202A (i.e., the USB interface 104 cannot supply sufficient power to satisfy the demand of the system loading power 110), such as depicted in FIG. 2 between at least $T_2$ and $T_4$. In some such examples, the dynamic current 404 may represent a discharging current flowing from the high-voltage capacitor 116 (or the like) to provide additional power to the system loading power 110.

As shown at the intersection point (e.g., the origin point of the power control graph 402) of the Y-axis 402Y and the X-axis 402X, the power-gap 406 is at the Y-axis 402Y and/or the X-axis 402X. In such examples, the power-gap 406 may represent a scenario when the system loading power line 204 is equal to the maximum power limit 202A (i.e., maximum capacity of the USB interface 104 is equal to the demand of the system loading power 110), such as depicted in FIG. 2 at least at the time marker $T_2$. In some such examples, the dynamic current 404 may be equal to 0.0A (to within a margin of error of 0.01A or another number).

As shown, the dynamic current 404 may be a function of the power-gap 406. For example, when the power-gap 406 is smaller (e.g., closer to the X-axis 402X) then the dynamic current 404 is also smaller. Further, when the power-gap 406 is larger (e.g., further away from the X-axis 402X) then the dynamic current 404 is also larger. In some examples, the dynamic current 404 may utilize at least a portion of the total unused power from the USB interface 104 (or the like) (e.g., when the system loading power line 204 is below the maximum power limit 202A) to charge the high-voltage capacitor 116 (or the like). For example, the dynamic current 404 may only utilize 50% (or another number) of the power-gap 406 to charge the high-voltage capacitor 116 (or the like) in order to maintain a power buffer for fluctuations in the system loading power line 204. In some examples, the dynamic current 404 may utilize at least a portion of the total energy of the high-voltage capacitor 116 (or the like) (e.g., when the system loading power line 204 is above the maximum power limit 202A) to compensate for the total power deficit in the power-gap 406. For example, the dynamic current 404 may only utilize 80% (or another number) of the total stored energy of the high-voltage capacitor 116 (or the like) in order to maintain the system loading power 110. It will be understood that the dynamic current 404 will compensate for the total power deficit in the power gap 406 when the system loading power line 204 is above the maximum power limit 202A (e.g., until the high-voltage capacitor 116 (or the like) is depleted and/or one or more of the reactive corrective actions 310 reduce the system loading power line 204 below the maximum power limit 202A). It will also be understood that the high-voltage capacitor 116 (or the like) may not be fully discharged each time the system loading power line 204 exceeds the maximum power limit 202A to compensate for the power deficit (e.g., as shown between $T_5$ and $T_6$ in the energy storage graph 206 of FIG. 2).

It should be appreciated that an advantage of the power based dynamic current control profile 400 is that it can save electricity by discharging energy from the high-voltage capacitor 116 as a function of (and/or in proportion to) the specific instantaneous power demands. For example, the control circuit 100, by using the power based dynamic current control profile 400 (or the like), may discharge only the amount of power needed to respond to transient power peaks. For instance, the power peak 204A and the power peak 204B (as shown in FIG. 2) each comprise a respective magnitude. Further, the control circuit 100 (by using the power based dynamic current control profile 400) can provide respective (or specific) discharge responses (i.e., a 'need-based' current control) as a function of (and/or in proportion to) each respective magnitude. To this end, the control circuit 100 may discharge more current (or provide more power) to compensate for the larger magnitude of the power peak 204A and may discharge relatively less current (or provide relatively less power) to compensate for the relatively smaller magnitude of the power peak 204B.

Now that an example power based dynamic current control profile has been described above with reference to FIG. 4, a traditional voltage based fixed current control profile will now be described below with reference to FIGS. 5 and 6.

FIG. 5 illustrates a traditional voltage based fixed current control profile for use with a traditional fixed current circuit (illustrated in FIG. 6). As shown, the traditional voltage based dynamic current control profile 500 is represented by the voltage control graph 502. The voltage control graph 502, as shown, comprises a Y-axis 502Y, an X-axis 502X, and a fixed control current 504 (depicted as a solid line). The Y-axis 502Y, in contrast to the Y-axis 402Y described above, represents only an amplitude of a current signal. The X-axis 502X, in contrast to the X-axis 402X described above, represents only a voltage threshold. The traditional voltage based dynamic current control profile 500 will control the fixed control current 504 based solely on a voltage relative to the voltage threshold. In contrast to the dynamic current 404 described above, the fixed control current 504 is not a function of any measured power (e.g., the power-gap 406) but instead is fixed (e.g., by a current limiter as shown in FIG. 6) at one amplitude which is either positive or negative depending on the direction of flow. It should be appreciated that a disadvantage of the traditional voltage based dynamic current control profile 500 is that it wastes electricity due to over discharging because the fixed control current 504 cannot be regulated for specific instantaneous power demands. For example, a traditional fixed current circuit, using the traditional voltage based dynamic current control profile 500, would discharge the same amount of electricity for transient power peaks of varying magnitudes (e.g., power peak 204A and power peak 204B, as shown in FIG. 2, would result in the same response from the traditional voltage based dynamic current control profile 500).

Now that an example power based dynamic current control profile has been described above with reference to FIG. 4 and contrasted against a traditional voltage based fixed current control profile with reference to FIGS. 5 and 6, examples of electronic devices that may benefit from the control circuit 100 (and/or the power characterization circuit 900 described below in connection with FIG. 9) will now be described in further detail below with reference to FIG. 7.

FIG. 7 illustrates a block diagram of an example electronic device, in accordance with various aspects of the present disclosure. The electronic device 700 as shown includes the system modules 122 (as described above in connection with at least FIGS. 1 and 3) and the power source(s) 712. The system modules 122, as shown, comprises the processor(s) 702, memory 704, network interface(s) 706, and graphics circuit 708. The graphics circuit 708 (e.g., graphics chip, card, etc.), as shown, may comprise at least one Graphics Processing Unit (GPU) 710. In some examples, the GPU 710 (and/or the like) may be the same as, or similar to, the processor(s) 702 as described herein. For example, the graphics circuit 708 may have a dedicated processor (e.g., GPU) and/or may leverage the processor(s) 702 (e.g., a primary CPU). The processor(s) 702 may perform various functions associated with controlling an operation of the electronic device 700, and the memory 704 may store instructions executable by the processor(s) 702 to perform the operations described herein.

Network interface(s) 706 permit the electronic device 700 to communicate over one or more networks. Example network interface(s) 706 include, without limitation, a Wi-Fi circuit (e.g., Dual-band 802.11 a/b/g/n/ac/ax 2×2 MIMO dual-antenna, Tri-band 802.11 a/b/g/n/ac/ax 2×2 MIMO dual-antenna, etc.), ZigBee circuit, Bluetooth circuit (e.g., Bluetooth 5.2, Bluetooth Low Energy (BLE), etc.), LTE circuit, and/or any other communications protocol, hardware, software, and/or firmware. The network interface(s) 706 permit communication with remote device(s), such as mobile devices (e.g., phones, television remotes, microphones, etc.), systems (e.g., cloud services, remote servers, etc.), and/or the like. The network(s) may be representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

In some instances, inbound data (e.g., from remote servers, television remotes, etc.) may be routed through the network interface(s) 706 before being directed to the processor(s) 702, and outbound data from the processor(s) 702 may be routed through the network interface(s) 706. The network interface(s) 706 may therefore receive inputs, such as data, from the processor(s) 702, the GPU 710, and/or any other component described herein. For example, the network interface(s) 706 may be configured to transmit data to and/or receive data from one or more network devices (e.g., Wi-Fi routers, etc.). The network interface(s) 706 may act as a conduit for data communicated between various components and the processor(s) 702 and/or the like.

The power source(s) 712, as shown, may be any power interface, input, and/or supply for supplying electricity (e.g., power, voltage, and/or current) to the electronic device 700 as described herein. In some examples, the power source(s) 712 may comprise, at least in part, the USB interface 104 and/or the like. For example, the power source(s) 712 may comprise at least a USB connector (as described herein, such as in connection with FIGS. 1 and 9), with or without a USB cable, configured to plug into a compatible USB port and at least receive electricity (e.g., power, voltage, and/or current) to operate the electronic device 700. In some examples, the electronic device 700 may be powered, at least in part, by a USB port of a host device (e.g., a television), mains electricity (e.g., a wall socket coupled to a public power grid), an energy storage device (e.g., high-voltage capacitor, capacitor bank, battery, etc.), and/or the like as described herein. In some examples, one or more batteries (e.g., rechargeable and/or non-rechargeable) may be a primary power source (or supply) for the electronic device 700 instead of the USB interface 104 and/or one or more batteries may be a backup power source (or supply), such as when the USB interface 104 is insufficient (e.g., during a transient power peak, etc.).

As used herein, a processor, such as the processor(s) 702, may include multiple processors and/or a processor having multiple cores. Further, the processor(s) 702 may comprise one or more cores of different types. For example, the processor(s) 702 may include application processor units, graphic processing units, and so forth. In one implementation, the processor(s) 702 may comprise a microcontroller and/or a microprocessor. The processor(s) 702 may include the GPU 710, a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System-On-a-Chip systems (SoCs), Complex Programmable Logic Devices (CPLDs), and/or the like. Additionally, each of the processor(s) 702 may possess its own local memory, which also may store at least one of program components, program data, program code, program instructions, firmware, software, Operating Systems (OS), and/or the like.

Memory, such as the memory 704, may include volatile and nonvolatile memory, removable and non-removable media implemented in any method or technology for storage of information, such as computer-readable instructions, data structures, program component, firmware, software, and/or any other data. The memory 704 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 704 may be implemented as computer-readable storage media (CRSM), which may comprise any available physical media accessible by the processor(s) 702 to execute instructions stored on the memory. In some examples, a CRSM may include random access memory (RAM) and flash memory (e.g., NAND flash, NOR flash, etc.). In other implementations, CRSM may include, but is not limited to, read-only memory (ROM), electrically erasable programmable read-only memory (EEPROM), or any other tangible medium which can be used to store the desired information, and which can be accessed by the processor(s). The memory 704 are examples of non-transitory computer-readable media. The memory 704 may store an OS and one or more software applications, instructions, programs, and/or data to implement the methods described herein and the functions attributed to the various systems.

Although certain components of the electronic device 700 are illustrated, it is to be understood that the electronic device 700 may include additional and/or alternative components. For example, the electronic device 700 may include other input/output devices (e.g., display screen, light emitting diode (LED), etc.), heat dissipating elements (e.g., heatsinks, fans, vents, etc.), computing components (e.g., Printed Circuit Boards (PCBs), such as to couple the components for the control circuit 100 and/or the like as described herein), antennas, ports (e.g., USB), and/or the like.

Now that examples of electronic devices that may benefit from the control circuit 100 (and/or the power characterization circuit 900 described below in connection with FIG. 9) have been described above with reference to FIG. 7, an example process for controlling system power and performance will now be described below with reference to FIG. 8.

FIG. 8 illustrates an example process for controlling system power and performance, in accordance with various aspects of the present disclosure. As shown, the process 800 may be used to provide additional power to an electronic device (e.g., electronic device 700) from an energy storage device (e.g., high-voltage capacitor 116 and/or the like as described herein). The operations of the process 800 may represent a series of instructions comprising computer readable machine code executable by a processing unit (e.g., processor(s) 702) of one or more computing devices described herein (e.g., electronic device 700, control circuit 100, and/or power characterization circuit 900 described below in connection with FIG. 9), although various operations may also be implemented in, or using, hardware (e.g., voltage sensors, current sensors, multimeters, and/or the like of electronic device 700, control circuit 100, and/or power characterization circuit 900). In some examples, the computer readable machine codes may be comprised of instructions selected from a native instruction set of at least one processor and/or an operating system of the electronic device. In some examples, the process 800 may be performed, at least in part, by one or more components of electronic device 700, control circuit 100, and/or power characterization circuit 900.

As shown in FIG. 8, the process 800 may begin at operation 802, at which the electronic device 700 (or the like as described herein) may detect a power limit for a power source. For example, a smart television streaming stick (or the like) may perform one or more power characterization (and/or power limit detection techniques as described herein) to detect (or determine) a maximum power limit for a USB port (or the like) of a television. For instance, the power characterization circuit 900 (described below in connection with FIG. 9) may, at least in part, perform a characterization state routine (e.g., characterization state routine 1100 described below in connection with FIG. 11) to determine a maximum power limit (or power capacity) for a static (or fixed) power source, such as a USB port with a maximum power limit of 4.5 W (or any other number, to within a ±10% tolerance). In some examples, the operation 802 may comprise, at least in part, the operation 1008 described below in connection with FIG. 10. In some examples, the operation 802 may comprise, at least in part, the characterization state routine 1100 described below in connection with FIGS. 11-12. In some examples, the operation 802 may comprise, at least in part, the operation 1314 described below in connection with FIG. 13. In some examples, the detection (or determination) of a maximum power limit for a static power source may be performed in real-time or near-real-time.

The process 800 may continue at operation 804, at which the electronic device 700 (or the like as described herein) may monitor a system loading power relative to the power limit. For example, the SPC 102 (as described above in connection with FIG. 1) may be configured (e.g., with at least one of a comparator, voltmeter, ammeter, and/or other instrumentation) to monitor a system loading power (e.g., systems loads, system loading power 110, and/or the like) of at least one of system modules 122 (e.g., an input node or terminal for a system module, processor(s) 702, network interface(s) 706, and/or the like). In some examples, the SPC 102 may receive system loading power information from the PMIC 108. For example, the PMIC 108 (or the like as described herein) may monitor (and/or control) the power transferred from a power source to one or more of system modules 122. In such examples, the PMIC 108 may transmit data signals to the SPC 102 indicating power drawn by individual system loads and/or a total system loading power. For instance, a streaming stick (equipped with at least SPC 102 or the like) may monitor the power consumed by any or all system modules (e.g., system modules 122) in relation to a maximum power limit for a USB port (e.g., as shown in the system loading power graph 202 of FIG. 2).

The process 800 may continue at operation 806, at which the electronic device 700 (or the like as described herein) may monitor a capacitor voltage of a capacitor. For example, the SPC 102 (as described above in connection with FIG. 1) may be configured (e.g., with at least one of a comparator, voltmeter, and/or other instrumentation) to monitor a capacitor voltage (e.g., capacitor charge, capacitor voltage ($V_{cap}$) 114A, and/or the like) of a capacitor voltage node (e.g., capacitor terminal, capacitor voltage node 114, and/or the like). For instance, a streaming stick (equipped with at least SPC 102 or the like) may monitor the capacitor charge level during charging and/or discharging of a high-voltage capacitor.

The process 800 may continue at operation 808, at which the electronic device 700 (or the like as described herein) may monitor a system voltage of a system voltage node. For example, the SPC 102 (as described above in connection with FIG. 1) may be configured (e.g., with at least one of a comparator, voltmeter, and/or other instrumentation) to monitor a system voltage (e.g., input voltage, system voltage ($V_{sys}$) 112A, and/or the like) of a system voltage node (e.g., input node, system voltage node 112, and/or the like). For instance, a streaming stick (equipped with at least SPC 102 or the like) may monitor the input voltage received from (or caused by) a USB port with which the streaming stick is coupled.

The process 800 may continue at operation 810, at which the electronic device 700 (or the like as described herein) may determine that the system loading power is less than the power limit. During operation of the electronic device the system loading power may be below the maximum power limit for the power source, such as shown in the system loading power graph 202 between at least $T_0$ and $T_1$ and described above in connection with FIG. 2. In some examples, the operation 810 may include periodically and/or continuously comparing the measured system loading power (e.g., of any or all system modules 122, etc.) to the detected maximum power limit (e.g., of a USB port, etc.).

The process 800 may continue at operation 812, at which the electronic device 700 (or the like as described herein) may charge the capacitor based on a surplus power-gap. For example, determining that the system loading power is less than the power limit (e.g., at operation 810) may indicate that there is a surplus amount of power (i.e., surplus power, excess power, etc.) that may, at least in part, be drawn from the power source. In such examples, the surplus power available from the power source may, at least in part, be drawn upon for (and/or directed to) powering (or charging) an energy storage device (e.g., capacitor, rechargeable battery, etc.). For example, the SPC 102 may control the inductor circuit 106 to divert, at least in part, the surplus power (and/or current) to the high-voltage capacitor 116 (as described above in connection with at least FIGS. 1-2). Additionally or alternatively, as described above in connection with FIG. 4, a power based dynamic current control profile 400 (or the like as described herein) may be utilized to charge the energy storage device (e.g., high-voltage capacitor 116 and/or the like) during charging phases and/or operations. In some examples, the operation 812 may include, at least in part, the operations, processes, and/or techniques for one or more charging phases described above in connection with FIG. 2, such as between $T_0$ and $T_1$, $T_4$ and $T_5$, $T_6$ and $T_7$, and/or the like. In some examples, the operation 812 may further include determining whether the energy storage device (e.g., high-voltage capacitor 116 and/or the like) is in an energy holding phase (and/or already fully charged to within a ±10% tolerance) as described above in connection with FIG. 2 (e.g., shown between $T_1$ and $T_2$ in the energy storage graph 206).

The process 800 may continue at operation 814, at which the electronic device 700 (or the like as described herein) may determine that the capacitor voltage is equal to one or more thresholds. In some examples, the operation 814 may include periodically and/or continuously comparing a capacitor voltage (or any other energy level of an energy storage device) to at least one threshold. For example, the SPC 102 (as described above in connection with FIG. 1) may be configured to monitor a capacitor voltage (as described above at operation 806) and may compare the measured capacitor voltage value to a predefined threshold value. For instance, as described above in connection with FIG. 2, the energy storage line 208 may be compared (or monitored relative to) one or more of the maximum energy threshold 206A, ready threshold 206B, a warning threshold 206C, an alarm threshold 206D, and/or the like as described herein, as shown in the energy storage graph 206. In some examples, the operation 814 may include determining that an energy storage level (e.g., the capacitor voltage, etc.) is equal, less than, or greater than, one or more thresholds (as described herein) to within a ±10% tolerance.

The process 800 may continue at operation 816, at which the electronic device 700 (or the like as described herein) may generate one or more system signals. In some examples, the SPC 102 (as described above in connection with FIG. 1) may be configured to detect, receive, and/or generate at least one of a ready signal 304, warning signal 306, alarm signal 308, and/or the like as described above in connection with FIGS. 2-3. For example, the SoC 302 (e.g., comprising the SPC 102) may detect, receive, and/or generate a ready signal 304 (as described above in connection with FIG. 3) when the energy storage line 208 of the energy storage graph 206 is equal to, or greater than, the ready threshold 206B (as described above in connection with FIG. 2). In some examples, the operation 816 may include, at least in part, the operations, processes, and/or techniques for detecting, receiving, and/or generating any or all signals (and/or the like) as described above in connection with FIGS. 2-3.

The process 800 may continue at operation 818, at which the electronic device 700 (or the like as described herein) may cease charging of the capacitor. In some examples, the SPC 102 may cease charging of an energy storage device (e.g., high-voltage capacitor 116, etc.) when the energy storage device is fully charged, such as during an energy holding phase (e.g., as shown in the energy storage graph 206 between $T_1$ and $T_2$ and described above in connection with FIG. 2). In such examples, the SPC 102 may control the inductor circuit 106 to block (or cease), at least in part, any surplus power (and/or current) from flowing to (and/or from) the high-voltage capacitor 116. In other examples, the SPC 102 may cease charging of an energy storage device (e.g., high-voltage capacitor 116, etc.) when there is a deficit power-gap and the energy storage device is required to be discharged to compensate for the system loading power, such as during a power peak (e.g., as shown in the energy storage graph 206 between $T_5$ and $T_6$ and described above in connection with FIG. 2). In such examples, the SPC 102 may control the inductor circuit 106 to reverse the current flowing through, at least in part, the inductor 106A to flow from the high-voltage capacitor 116 to the system voltage node 112 (as described below in connection with the operation 822). In some examples, the operation 818 may include, at least in part, the operations, processes, and/or techniques for one or more holding phases described above in connection with FIG. 2, such as between $T_1$ and $T_2$, $T_7$ and $T_8$, and/or the like. In some examples, the operation 818 may include, at least in part, the operations, processes, and/or techniques for one or more transition points in the energy storage graph 206 described above in connection with FIG. 2, such as shown at time marker $T_5$.

The process 800 may continue at operation 820, at which the electronic device 700 (or the like as described herein) may determine that the system loading power is greater than the power limit. During operation of the electronic device the system loading power may exceed the maximum power limit for the power source, such as shown in the system loading power graph 202 between $T_1$ and $T_4$ (and between $T_5$ and $T_6$) and described above in connection with FIG. 2. In some examples, the operation 820 may include periodically and/or continuously comparing the measured system loading power (e.g., of any or all system modules 122, etc.) to the detected maximum power limit (e.g., of a USB port, etc.).

The process 800 may continue at operation 822, at which the electronic device 700 (or the like as described herein)

may discharge the capacitor based on a deficit power-gap. For example, determining that the system loading power is greater than the power limit (e.g., at operation 820) may indicate that there is a deficit of power between the power source and the system loading power. In such examples, the deficit power-gap may be compensated for, at least in part, using stored energy available from an energy storage device (e.g., capacitor, rechargeable battery, etc.). For example, the SPC 102 may control the inductor circuit 106 to release (or discharge), at least in part, the surplus power (and/or current) stored in the high-voltage capacitor 116 (as described above in connection with at least FIGS. 1-2) to compensate for any transient power peaks (e.g., power peak 204A, power peak 204B, or the like). Additionally or alternatively, as described above in connection with FIG. 4, a power based dynamic current control profile 400 (or the like as described herein) may be utilized to discharge the energy storage device (e.g., high-voltage capacitor 116 and/or the like) during discharge phases and/or operations. It should be appreciated that an advantage of using the power based dynamic current control profile 400 (over traditional systems and techniques) is that the power based control scheme (as described above in connection with at least FIG. 4) can save electricity by discharging energy from the high-voltage capacitor 116 as a function of (and/or in proportion to) the specific instantaneous power demands. In some examples, the operation 822 may include, at least in part, the operations, processes, and/or techniques for one or more discharge phases described above in connection with FIG. 2, such as between $T_2$ and $T_3$, $T_3$ and $T_4$, $T_5$ and $T_6$, and/or the like. In some examples, the operation 822 may further include generating and/or displaying (e.g., on a television screen or the like) an alarm signal that indicates (i) the high-voltage capacitor is depleted, (ii) the system voltage is decreasing, and/or (iii) a shutdown mode is required. In some examples, the operation 822 may include initiating a shutdown mode in response to an alarm signal (e.g., alarm signal 308 or the like). In some such examples, the shutdown mode comprises shutting down the electronic device.

Now that various example systems and processes for, and advantages of, the control circuit 100 have been described above with reference to FIGS. 1-8, examples of the architecture and componentry for example power characterization circuits will now be described below with reference to FIG. 9.

FIG. 9 illustrates an example power characterization circuit 900 for characterizing the maximum power limit (or power capacity) of a power source (e.g., the USB interface 104), in accordance with various aspects of the present disclosure. As shown in FIG. 9, the power characterization circuit 900 may comprise Universal Serial Bus (USB) interface 9104, Power Management Integrated Circuit (PMIC) 9108, system voltage node 9112, transistor 938, ground component 9118, and resistor 936. In some examples, the power characterization circuit 900 may be communicatively coupled to one or more of system modules 122 (shown in FIG. 7) and/or one or more of the components of control circuit 100 (shown in FIG. 1). For example, the power characterization circuit 900 may be further coupled to the inductor circuit 106 (shown in FIG. 1) via a system voltage node (e.g., system voltage node 112 and/or system voltage node 9112). It will be understood that while the example power characterization circuit 900 illustrated in FIG. 9 includes various connections to ground component 9118, in some implementations such connections may instead be made to lower potential nodes (such as nodes having lower voltages and/or negative voltages), in accordance with the desired implementation.

The USB interface 9104, as shown, may be the same as, or similar to (i.e., comprise at least one feature and/or aspect of), the USB interface 104 described above in connection with at least FIG. 1. The USB interface 9104, as shown, may comprise one or more of a USB connector, a USB cable, and/or a USB port. For example, the power characterization circuit 900 may be integrated into an electronic device (e.g., electronic device 700) which includes a USB cable and/or a USB connector configured to receive power from (and/or transfer data with) a compatible USB port. The USB interface 9104 may comprise any USB standard and/or any USB type (e.g., with a maximum power limit or capacity). For example, the USB interface 9104 may comprise any USB standard including, without limitation, USB 1.0, 2.0, 3.0, 3.1, 3.2, USB4, USB4 2.0, and/or the like. The USB interface 9104 may further comprise any USB type including, without limitation, Type-A, Type-B, Type-C, Mini-USB, Micro-USB, and/or the like. In some examples, the USB interface 9104 may comprise a power supply (or source) other than, or in addition to, a USB specification. In such examples, the power supply (or source) may comprise one or more of a battery (e.g., single use or rechargeable), a power grid (e.g., electrical socket, public grid, microgrid, etc.), a solar panel, a transformer, and/or any other electrical power source (e.g., with a maximum power limit or capacity) configured to power an electronic device (e.g., electronic device 700).

The system voltage node 9112, as shown, may be the same as, or similar to (i.e., comprise at least one feature and/or aspect of), the system voltage node 112 described above in connection with at least FIG. 1. The system voltage node 9112, as shown, may comprise any or all regions on the power characterization circuit 900 coupling at least the USB interface 9104, the PMIC 9108, and the transistor 938. In some examples, the system voltage node 9112 may comprise a point (or location) in the power characterization circuit 900 from which the system voltage ($V_{sys}$) 9112A (e.g., an input voltage (Vin)) may be determined (e.g., measured by the SPC 102 (shown in FIG. 1), a voltage meter, and/or similar electrical instrumentation).

The system voltage ($V_{sys}$) 9112A, as shown, may be the same as, or similar to (i.e., comprise at least one feature and/or aspect of), the system voltage node 112 described above in connection with at least FIG. 1. In some examples, the system voltage ($V_{sys}$) 9112A may represent an electrical connection (e.g., a direct connection and/or an indirect connection as described herein) between the system voltage node 9112 and at least the SPC 102 (shown in FIG. 1). In some such examples, the system voltage ($V_{sys}$) 9112A may further represent a voltage meter and/or similar electrical instrumentation for measuring and/or monitoring the voltage of the system voltage node 9112 (or the like as described herein). In such examples, any voltage meter and/or similar electrical instrumentation may transmit any or all voltage measurements to at least the SPC 102 (shown in FIG. 1).

The ground component 9118, as shown, may be the same as, or similar to (i.e., comprise at least one feature and/or aspect of), the ground component 118 described above in connection with at least FIG. 1. The ground component 9118, as shown, may comprise one or more of a USB ground pin of the USB interface 9104, a negative terminal of a battery, a frame of an electronic device (e.g., a case or housing of a television), an electrical socket grounding wire, an earthing electrode, the Earth, and/or any other electrical grounding used for electrical potential reference and/or for electrical shock mitigation. For example, a streaming stick may be grounded to an electrical socket grounding wire via a ground pin of a USB port of a television that is coupled to the electrical socket.

The PMIC 9108, as shown, may be the same as, or similar to (i.e., comprise at least one feature and/or aspect of), the PMIC 108 described above in connection with at least FIG. 1. The PMIC 9108, as shown, may comprise an integrated circuit (e.g., a System on a Chip (SoC), etc.) configured, at least in part, to control the flow of electrical power to operate an electronic device (e.g., electronic device 700) and/or characterize the maximum power limit (or power capacity) of a power source (e.g., the USB interface 104). For example, the PMIC 9108 may enable (or activate), disable (or deactivate), and/or reduce the performance of one or more of the system modules 122 (e.g., by reducing power to a respective system module) based on the results of a characterization state routine (e.g., characterization state routine 1100 described below in connection with FIGS. 11-13).

As shown, the PMIC 9108 may further comprise a finite state machine (FSM) 902, characterization finite state machine (CFSM) 904, monitoring and logging circuit 908, register(s) 924, digital-to-analog converter (DAC) 926, and at least one electrical bus (e.g., electrical bus 906A, electrical bus 906B, and/or electrical bus 906C). In some examples, the PMIC 9108 may further comprise hardware (e.g., field-programmable gate arrays (FPGAs), application-specific integrated circuits (ASICs), etc.), software (e.g., executable program code, etc.), firmware (e.g., Basic Input/Output System (BIOS), etc.), and/or the like as described herein to perform one or more operations as described in connection with FIGS. 3, 8, 10, 11, 12, and/or 13. In some examples, the SPC 102 (shown in FIG. 1) and the PMIC 9108 may comprise a single circuit, SoC (e.g., SoC 302 shown in FIG. 3), and/or the like as described herein.

The monitoring and logging circuit 908, as shown, may comprise connector 916, multiplexer 918, analog-to-digital converter (ADC) 920, register(s) 922, comparator 910, and a connection to reference voltage ($V_{ref}$) 914. Further, as shown, the monitoring and logging circuit 908 may be configured to monitor the system voltage ($V_{sys}$) 9112A and/or the sinking current caused (or generated) by the controlled current sink 906 and record (or log) any or all voltage and/or current values (e.g., to memory 704, register(s) 922, or the like). In some examples, the monitoring and logging circuit 908 may comprise any electronic device and/or component(s) configured to monitor and record the system voltage ($V_{sys}$) 9112A and/or the sinking current as described herein.

The connector 916, as shown, may comprise any electrical connection as described herein. For example, the connector 916 may be a pin (or input) of an integrated circuit. It will be understood that some electrical circuit connectors (as shown in FIG. 9) are illustrated as square nodes, this is done for illustrative purposes and to facilitate clearer description of the examples described herein. It will be understood that a “connector” or “electrical connector” may provide negligible electrical resistance and, thus, may share the same electrical potential with any or all regions on a circuit directly coupled to the connector.

The multiplexer (or MUX) 918, as shown, may comprise any electronic device, or data selector, for selecting from a plurality of analog and/or digital input signals and forwarding the selected input to a single output line. It will be understood that the illustrated example depicts a single input line into the multiplexer 918 from the connector 916 for illustrative purposes and that additional input lines may be connected to the multiplexer 918 in accordance with one or more desired implementations.

The ADC 920, as shown, may comprise any electronic component and/or integrated circuit configured to convert any analog signal (e.g., voltage signal, current signal, continuous-time signal, and/or the like) into a digital signal (e.g., binary signal, discrete time signal, quantized amplitude signal, and/or the like). For example, ADC 920 may receive, from at least the output line of the multiplexer 918, an analog voltage signal and generate a digital signal (comprising binary 1 and 0 values). Further, the ADC 920 may transmit, via the electrical bus 906B, the analog voltage signal (or any other analog signal described herein) to at least the register(s) 922 as shown. In some examples, the ADC 920 may continuously measure the system voltage ($V_{sys}$) 9112A, allowing for simultaneous measurement and storage of both current and voltage information.

The register(s) 922, as shown, may comprise one or more of a processor register (e.g., data register, address register, status register, special-purpose register, vector register, etc.), a hardware register, a register file, an integrated circuit-based register file, and/or any other register (and/or register file) including, or implemented using, or in conjunction with, storage media (e.g., memory 704, static or dynamic RAM, etc.). For example, the register(s) 922 may comprise an 8-bit register, 32-bit register, 64-bit register, or any other register (with any other number of bits). In some examples, the register(s) 922 may be the same as, or similar to, the register(s) 924. As shown, the register(s) 922 may receive input signals (or data) from the ADC 920 via electrical bus 906B. In some examples, the register(s) 922 may receive one or more logging control signals (or logging data) from the CFSM 904 via the electrical bus 906A. Further, the register(s) 922 may receive a characterization signal (e.g., the highest power number generated during performance of a respective characterization state routine) from the CFSM 904 via the electrical bus 906A and/or a separate connection (such as illustrated in FIG. 9). In some examples, the ADC 920 may provide 8-bit (or another number) resolution and/or an 8-bit (or another number) digital output and the electrical bus 906B may comprise 8-connections (or another number) between the ADC 920 and the register(s) 922. In some examples, the electrical bus 906A, the electrical bus 906B, and/or the electrical bus 906C may comprise one or more connections (e.g., 1, 8, 16, or any other number) between two or more components as described herein and/or illustrated in FIG. 9.

The comparator 910, as shown, may comprise any electronic component and/or integrated circuit configured to receive and compare a plurality of input signals (e.g., voltage signals, current signals, analog signals, etc.) and output a digital signal indicating which of the inputs is larger. For example, the comparator 910, as shown, may comprise an operation amplifier (op-amp) configured to compare the voltage at the system voltage node 9112 (e.g., the system voltage ($V_{sys}$) 9112A, or the like) to a reference voltage ($V_{ref}$) 914. It will be understood that, in some examples, such as illustrated, the voltage at the system voltage node 9112 will be equal to the voltage at connector 916. Further, as shown, the comparator 910 can output a digital signal to the CFSM 904 indicating which voltage is larger, the reference voltage ($V_{ref}$) 914 or the system voltage ($V_{sys}$) 9112A. In some examples, the reference voltage ($V_{ref}$) 914 may represent a reference voltage node or any other point (or location) in the electronic device 700 from which the reference voltage ($V_{ref}$) 914 may be determined (e.g., measured by the comparator 910, a voltage meter, and/or similar electrical instrumentation). In some examples, the reference voltage ($V_{ref}$) 914 may represent an electrical connection (e.g., a direct connection and/or an indirect connection as described herein) between the comparator 910 and any other component of the electronic device 700, the control circuit 100, and/or the power characterization circuit 900. In some such examples, the reference voltage ($V_{ref}$) 914 may further represent a voltage meter and/or similar electrical instrumentation for measuring and/or monitoring a voltage and outputting a voltage signal indicating the measured voltage. In such examples, any voltage meter and/or similar electrical instrumentation may transmit any or all voltage measurements to at least the comparator 910.

In some examples, the comparator 910 may be a continuous-time comparator that monitors the system voltage ($V_{sys}$) 9112A against a fixed reference voltage (e.g., the reference voltage ($V_{ref}$) 914). In some such examples, if the system voltage ($V_{sys}$) 9112A collapses (or drops in voltage, such as shown at T'c in FIG. 12), then the comparator 910 detects the collapse and immediately (e.g., instantaneously, in real-time, near-real-time, etc.) shuts off the sinking current by causing the transistor 938 to close (e.g., cutoff current flow, pull down the gate, etc.). It should be appreciated that such a safeguard is important because if the system voltage ($V_{sys}$) 9112A drops too low then all memory (and/or registers) inside the PMIC 9108 may be erased which may prevent the system from storing power, voltage, and/or current measurements.

The FSM 902, as shown, may comprise a dedicated integrated circuit (e.g., SoC, etc.) configured to detect when an electronic device is plugged into a USB port (or other power source) and determine whether to start a characterization state routine (e.g., characterization state routine 1100 described below in connection with FIG. 11). The FSM 902 may be further configured to determine to run the system bootup process (e.g., with or without starting a characterization state routine). In some examples, the FSM 902 may be further configured to perform one or more operations of a finite state routine (e.g., finite state routine 1000 described below in connection with FIG. 10). As shown, FSM 902 may be communicatively coupled to the CFSM 904 to exchange data signals (e.g., start signal 904A, done signal 904B, and/or the like). In some examples, the FSM 902 may comprise hardware (e.g., field-programmable gate arrays (FPGAs), application-specific integrated circuits (ASICs), Programmable Read Only Memory (PROM), One-Time-Programmable Memory (OTP), etc.), software (e.g., executable program code, etc.), firmware (e.g., Basic Input/Output System (BIOS), etc.), and/or the like as described herein to perform one or more operations as described in further detail below in connection with FIGS. 10-13.

The CFSM 904, as shown, may comprise a dedicated integrated circuit (e.g., SoC, etc.) configured to incrementally increase a sinking current and record a system voltage response. In some examples, the CFSM 904 may be further configured to perform one or more operations of a characterization state routine (e.g., characterization state routine 1100 described below in connection with FIG. 11). In some examples, the CFSM 904 may comprise hardware (e.g., field-programmable gate arrays (FPGAs), application-specific integrated circuits (ASICs), Programmable Read Only Memory (PROM), One-Time-Programmable Memory (OTP), etc.), software (e.g., executable program code, etc.), firmware (e.g., Basic Input/Output System (BIOS), etc.), and/or the like as described herein to perform one or more operations as described in further detail below in connection with FIGS. 10-13.

The register(s) 924, as shown, may comprise one or more of a processor register (e.g., data register, address register, status register, special-purpose register, vector register, etc.), a hardware register, a register file, an integrated circuit-based register file, and/or any other register (and/or register file) including, or implemented using, or in conjunction with, storage media (e.g., memory 704, static or dynamic RAM, etc.). In some examples, the register(s) 924 may be the same as, or similar to, the register(s) 922 described above. As shown, the register(s) 922 may receive input signals (or data) from the CFSM 904 to control the current incrementation (performed at least in part by the controlled current sink 906) by stepping through program code (e.g., Refdac<6:1> code as illustrated). Further, as shown, the register(s) 924 may transmit digital signals (e.g., control signals), via electrical bus 906C, to DAC 926 in order to regulate the sinking current using the controlled current sink 906.

The DAC 926, as shown, may comprise any electronic component and/or integrated circuit configured to convert any digital signal (e.g., binary signal, discrete time signal, quantized amplitude signal, and/or the like) into an analog signal (e.g., voltage signal, current signal, continuous-time signal, and/or the like). For example, DAC 926 may receive (from at least the CFSM 904 and/or the register(s) 924) a digital signal (e.g., a control signal comprising binary 1 and 0 values) and generate an analog voltage signal (or the like). Further, the DAC 926 may transmit the analog voltage signal (or the like) to at least the controlled current sink 906 (e.g., the comparator 928 as shown).

The controlled current sink 906, as shown, may comprise comparator 928, connector 930, connector 932, resistor 934, ground component 9118, transistor 938, and resistor 936. Further, as shown, the controlled current sink 906 may comprise any electronic component and/or integrated circuit configured to cause (or generate) a sinking current in order to absorb (or "sink") current from the system voltage node 9112. In some examples, the controlled current sink 906 may comprise any electronic device and/or component(s) configured to produce a sinking current as described herein.

The connector 930 and/or the connector 932, as shown, may comprise any electrical connection as described herein. For example, the connector 930 (and/or the connector 932) may be a pin (or input) of an integrated circuit. The comparator 928, as shown, may comprise any electronic component and/or integrated circuit configured to receive and compare a plurality of input signals (e.g., voltage signals, current signals, analog signals, etc.) and output a digital signal indicating which of the inputs is larger. For example, the comparator 928, as shown, may comprise an operation amplifier (op-amp) configured to compare the voltage at (or current from) the connector 932 to the voltage at (or current from) the output of DAC 926. The resistor 934, as shown, may comprise at least one resistor (e.g., fixed, variable, carbon composition, carbon pile, carbon film, wire wound, metal oxide, metal foil, and/or the like) configured to provide an electrical resistance (e.g., 50Ω, 1.0 kΩ, or any other resistance value) in accordance with the desired implementation.

The resistor 936, as shown, may comprise at least one resistor (e.g., fixed, variable, carbon composition, carbon pile, carbon film, wire wound, metal oxide, metal foil, and/or the like) configured to provide an electrical resistance (e.g., 50Ω, 1.0 kΩ, or any other resistance value), such as in accordance with a desired implementation. As shown, the resistor 936 may be coupled to the PMIC 9108 via the connector 932. In other examples, the resistor 936 may be included inside, integrated into, or embedded in, the PMIC 9108, such as during manufacture of the PMIC 9108.

The transistor 938, in some examples, may comprise at least one transistor (e.g., bipolar junction transistor (BJT), metal oxide semiconductor field effect transistor (MOSFET), P-channel transistor, N-channel transistor, and/or the like) configured to control (or regulate) the amount of current entering the controlled current sink 906 from the system voltage node 9112, such as in accordance with the desired implementation. As shown in the illustrated example, the transistor 938 is depicted as an N-type metal-oxide-semiconductor (nMOS) transistor. The system voltage node 9112, as shown, may be coupled to the "drain" terminal of the transistor 938. Further, as shown, the resistor 936 may be coupled to the "source" terminal of the transistor 938. In addition, as shown, the output of the comparator 928 may be coupled to the "gate" terminal of the transistor 938. In the depicted example, electrical current may flow between the "drain" terminal and the "source" terminal when the comparator 928 applies a voltage signal (or the like) to the "gate" terminal. In some such examples, the PMIC 9108 may control (or regulate) the sinking current by changing (or controlling) the output of the comparator 928. As shown, the transistor 938 may be coupled to the PMIC 9108 via the connector 930. In other examples, the transistor 938 may be included inside, integrated into, or embedded in, the PMIC 9108, such as during manufacture of the PMIC 9108.

Now that examples of the architecture and componentry for the power characterization circuit 900 have been described above with reference to FIG. 9, an example finite state machine block diagram for booting an electronic device comprising the power characterization circuit 900 will now be described below with reference to FIG. 10.

Figure 10:
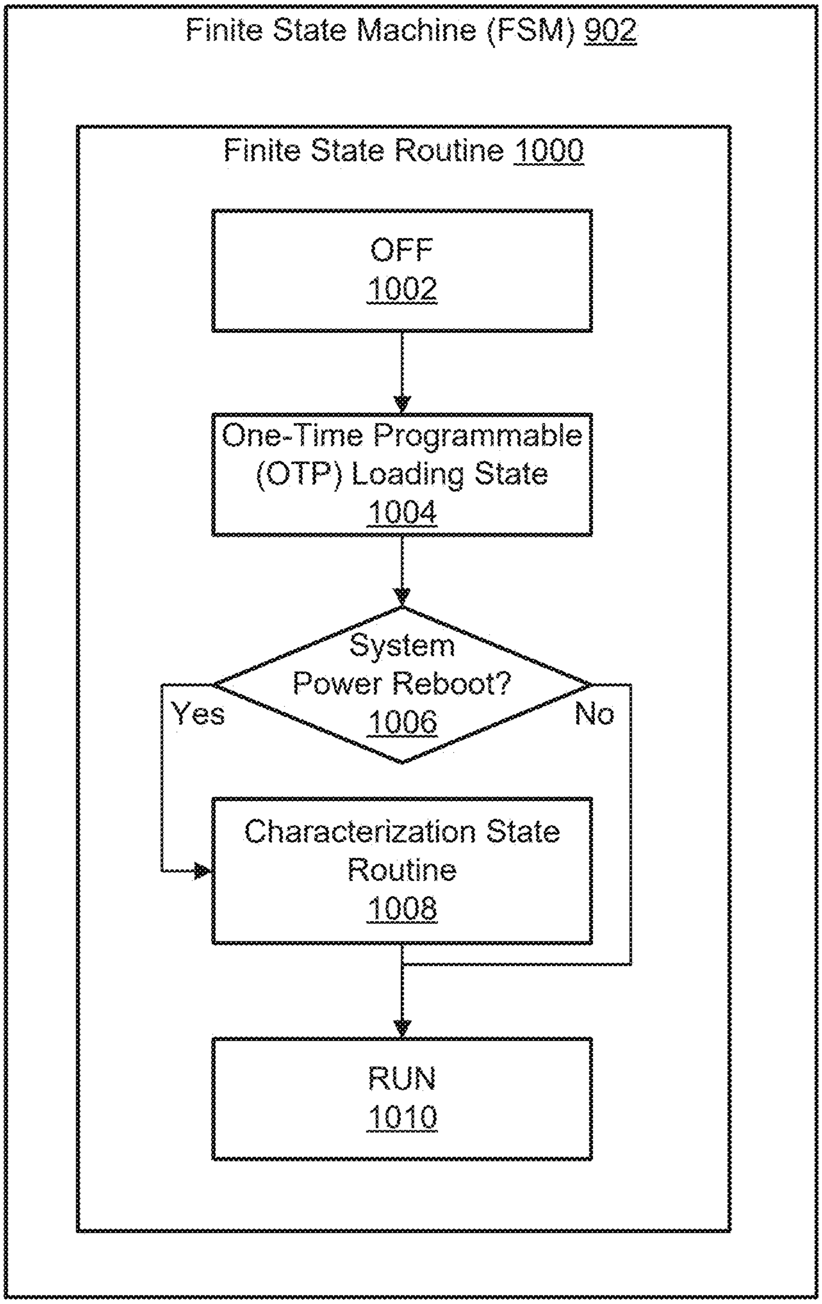
FIG. 10 illustrates an example finite state machine block diagram, in accordance with various aspects of the present disclosure.

FIG. 10 illustrates an example finite state machine block diagram, in accordance with various aspects of the present disclosure. As shown, the FSM 902 may be configured to perform one or more operations of a finite state routine 1000. The finite state routine 1000, as shown, may be performed prior to full system bootup to ensure that all system modules (e.g., systems modules 122) are turned off (or deactivated). The finite state routine 1000, as shown, may determine whether to perform a characterization state routine (e.g., characterization state routine 1100) before initiating full system bootup operations (e.g., for electronic device 700). In some examples, the finite state routine 1000 may represent a series of instructions comprising computer readable machine code executable by at least the power characterization circuit 900 (and/or the like as described herein). In some examples, the computer readable machine codes may be comprised of instructions selected from a native instruction set of at least one processor and/or an operating system of the electronic device 700 (and/or the like as described herein). In some examples, the finite state routine 1000 may be performed, at least in part, by one or more components of electronic device 700, control circuit 100, and/or power characterization circuit 900.

As shown in FIG. 10, the finite state routine 1000 may begin at operation 1002, at which the FSM 902 (and/or any other component(s) as described herein) may be in an OFF and/or unpowered state. For example, the electronic device 700 may be disconnected from its power source (e.g., power source 712, USB interface 9104, and/or the like). In some examples, such as depicted, when the electronic device 700 is connected to a power source (e.g., plugged into a USB port, etc.) and/or an ON signal is received (e.g., from a user pressing a power button, such as on the electronic device 700, a television comprising a USB port, a remote control, etc.), the FSM 902 may transition from operation 1002 to operation 1004 of the finite state routine 1000. In some examples, the operation 1002 may comprise, at least in part, the operation 1302 described below in connection with FIG. 13.

The finite state routine 1000 may continue at operation 1004, at which the FSM 902 (and/or any other component(s) as described herein) may perform, initiate, and/or call a One-Time-Programmable (OTP) loading state. For example, the FSM 902 may comprise Programmable Read Only Memory (PROM) and/or One-Time-Programmable Memory (OTP) that is programmed to run or execute one or more operations (e.g., described in connection with operation 1006, operation 1008, and/or the like) prior to performing, initiating, and/or calling a RUN state (e.g., causing the full system bootup routine at operation 1010). It will be understood that PROM and/or OTP devices can be programmed after manufacturing making them more flexible. Additionally or alternatively, once a PROM and/or OTP device is programmed the contents cannot be changed (or altered) and the contents are retained even after power is removed from the device. In some examples, the operation 1004 may comprise, at least in part, the operation 1304 described below in connection with FIG. 13.

The finite state routine 1000 may continue at operation 1006, at which the FSM 902 (and/or any other component(s) as described herein) may determine whether a system power reboot occurred. For example, if a streaming stick (e.g., embodied as electronic device 700 and/or configured with control circuit 100 and/or power characterization circuit 900) was disconnected from a USB port of a television then the streaming stick may lose power and/or any previously stored results (e.g., stored power limit, etc.) of a previous characterization state routine. Further, the next time the streaming stick is plugged into the same or another USB port (e.g., as described at operation 1002), the FSM 902 may determine that, "Yes," the streaming stick experienced a system power reboot and a characterization state routine (e.g., characterization state routine 1100) needs to be performed for the USB port to determine a maximum power limit or power capacity of the USB port. In such examples, the finite state routine 1000 may proceed to operation 1008. In some examples, if the streaming stick was not disconnected from a USB port of a television, then (even if turned off or deactivated) the streaming stick may still receive sufficient power (e.g., from the television) to retain the results of the previous characterization state routine. In such examples, the FSM 902 may determine that, "No," the streaming stick did not experience a system power reboot and a characterization state routine is not necessary at least at this time. In such examples, the finite state routine 1000 may proceed to operation 1010. In some examples, the FSM 902 may determine to perform a characterization state routine (e.g., characterization state routine 1100) whenever results for a previous characterization state routine cannot be found in a register and/or on a memory device of the electronic device 700 (e.g., when the electronic device is first powered on by an end-user and a characterization state routine was not previously performed). In such examples, the finite state routine 1000 may proceed to operation 1008. In some examples, the operation 1006 may comprise, at least in part, the operation 1306 described below in connection with FIG. 13. In some examples, the operation 1006 may comprise, at least in part, the operation 1312 described below in connection with FIG. 13.

The finite state routine 1000 may continue at operation 1008, at which the FSM 902 (and/or any other component(s) as described herein, such as CFSM 904) may perform, initiate, and/or call a characterization state routine (e.g., the characterization state routine 1100 described in connection with FIG. 11). For example, as shown in FIG. 9, the FSM 902 may generate and/or transmit a start signal 904A to the CFSM 904 in order to initiate the characterization state routine. Further, the CFSM 904 may generate and/or transmit a done signal 904B back to the FSM 902 once the characterization state routine is complete. In some examples, the operation 1008 may comprise, at least in part, the characterization state routine 1100 described below in connection with FIGS. 11-12. In some examples, the operation 1008 may comprise, at least in part, the operation 1314 described below in connection with FIG. 13.

It should be appreciated that, in some examples, the characterization state routine runs between the OTP loading state (described above at operation 1004) and the RUN state (described above at operation 1010), ensuring that all power loads (e.g., any or all of the system modules 122 shown in FIG. 7) are off during the routine which guarantees that the controlled current sink 906 (shown in FIG. 9) is the only power-consuming component during the characterization state routine. It should be further appreciated that this may facilitate measurements of the maximum power limit or power capacity with a higher degree of accuracy than if other power loads were activated.

The finite state routine 1000 may continue at operation 1010, at which the FSM 902 (and/or any other component(s) as described herein) may perform, initiate, and/or call a RUN state (e.g., causing the full system bootup routine, etc.). In some examples, such as when operation 1008 is performed, the operation 1010 may comprise, at least in part, one or more of operations 1316-1330 described below in connection with FIG. 13. In some such examples, the operation 1010 may further comprise performing one or more corrective actions (as described herein) before initiating a system bootup routine. In other examples, such as when operation 1008 is not performed (or skipped), the operation 1010 may comprise, at least in part, one or more of operations 1308-1310 described below in connection with FIG. 13.

Now that an example finite state machine block diagram for booting an electronic device comprising the power characterization circuit 900 has been described above with reference to FIG. 10, an example characterization finite state machine block diagram for characterizing a power source for an electronic device comprising the power characterization circuit 900 will now be described below with reference to FIGS. 11-12.

Figure 11:
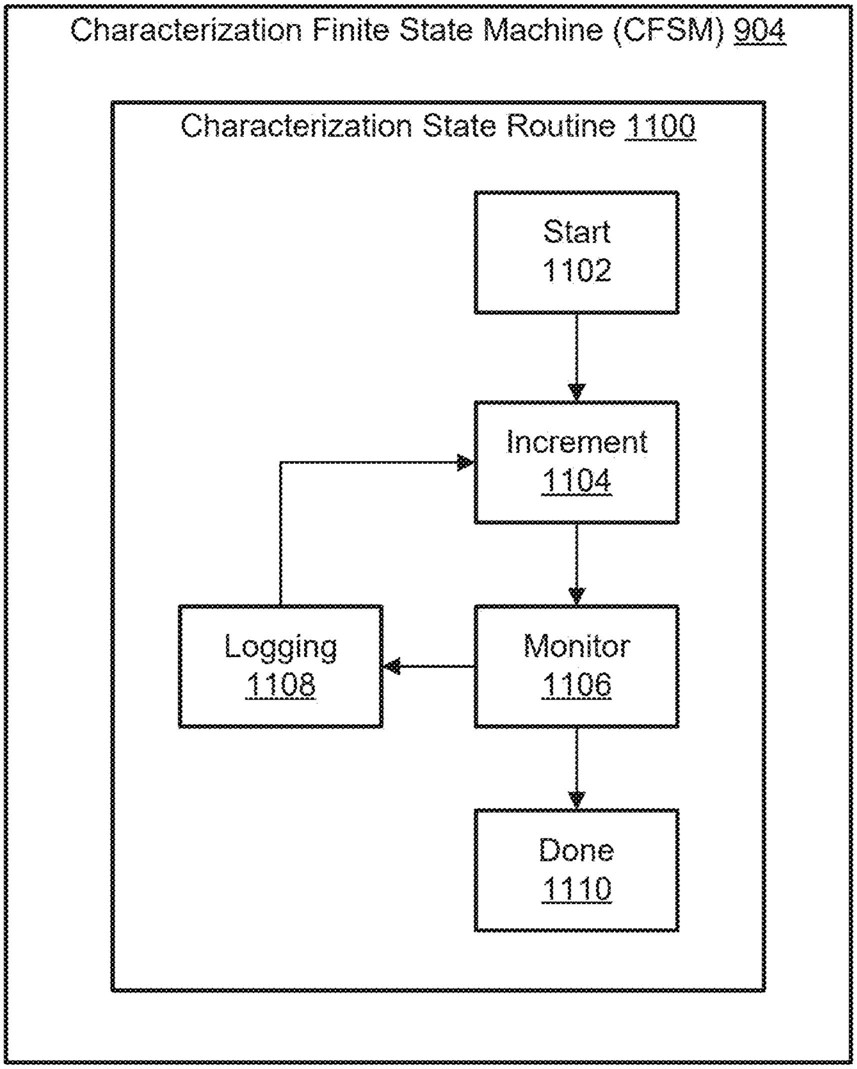
FIG. 11 illustrates an example characterization finite state machine block diagram, in accordance with various aspects of the present disclosure.

FIG. 11 illustrates an example characterization finite state machine block diagram, in accordance with various aspects of the present disclosure. As shown, the CFSM 904 may be configured to perform one or more operations of a characterization finite state routine 1100. The characterization finite state routine 1100, as shown, may be performed prior to full system bootup (e.g., at operation 1008 shown in FIG. 10 and/or at operation 1314 shown in FIG. 13) to ensure that all system modules (e.g., system modules 122) are turned off (or deactivated). The characterization finite state routine 1100, as shown, may determine (or detect) the maximum power limit or power capacity of a power source, such as a USB port of a television. In some examples, the characterization finite state routine 1100 may represent a series of instructions comprising computer readable machine code executable by at least the power characterization circuit 900 (and/or the like as described herein). In some examples, the computer readable machine codes may be comprised of instructions selected from a native instruction set of at least one processor and/or an operating system of the electronic device 700 (and/or the like as described herein). In some examples, the characterization finite state routine 1100 may be performed, at least in part, by one or more components of electronic device 700, control circuit 100, and/or power characterization circuit 900.

As shown in FIG. 11, the characterization finite state routine 1100 may begin at operation 1102, at which the CFSM 904 (and/or any other component(s) as described herein) may receive a start signal. For example, as shown in FIG. 9, the FSM 902 may generate and/or transmit a start signal 904A to the CFSM 904 in order to initiate the characterization state routine 1100. In some examples, the operation 1102 may, at least in part, occur at (or coincide with) the time marker $T'_0$ as shown in FIG. 12.

Figure 12:
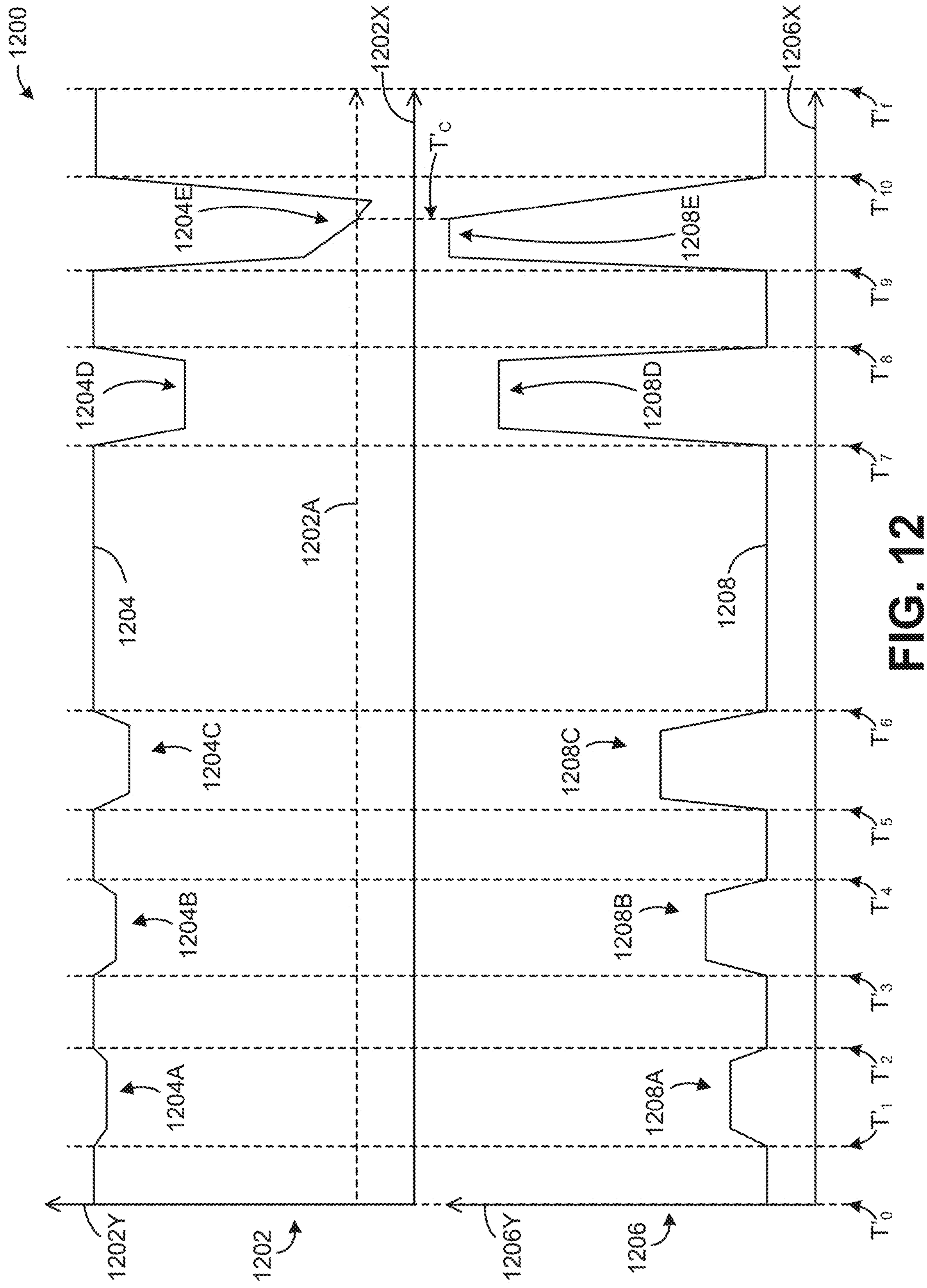
FIG. 12 illustrates example waveforms for system voltage and sinking current during an example characterization state routine, in accordance with various aspects of the present disclosure.

The characterization finite state routine 1100 may continue at operation 1104, at which the CFSM 904 (and/or any other component(s) as described herein) may incrementally increase the sinking current to one or more sinking current increments (e.g., any or all of sinking current increments 1208A-1208E as shown in FIG. 12 and described below) to within a ±10% tolerance or another number. For example, the CFSM 904 may transmit a control signal (or the like), at least in part, to the controlled current sink 906 (shown in FIG. 9) that causes the controlled current sink 906 to increase the sinking current to at least one sinking current increment (e.g., to with a ±10% tolerance or another number). In some examples, the operation 1104 may be performed in one or more iterations (e.g., in conjunction with operation 1106 and/or operation 1108 as described below). In such examples, each iteration of the operation 1104 may, at least in part, occur during (or coincide with) one or more of the time intervals shown in FIG. 12. For example, a first iteration of operation 1104 may occur at, or between, $T'_1$ and $T'_2$ when the sinking current increases to the sinking current increments 1208A as shown in the sinking current graph 1206 (described below in connection with FIG. 12). A second iteration of operation 1104 may occur at, or between, $T'_3$ and $T'_4$ when the sinking current increases to the sinking current increment 1208B as shown in the sinking current graph 1206 of FIG. 12. A third, fourth, and fifth iteration of operation 1104 may correspond with time intervals between $T'_5$ and $T'_6$, $T'_7$ and $T'_8$, and $T'_9$ and $T'_{10}$ respectively as shown in the sinking current graph 1206 of FIG. 12. It will be understood that more or less iterations than illustrated in FIG. 12 may be performed, in accordance with the desired implementation.

The characterization finite state routine 1100 may continue at operation 1106, at which the CFSM 904 (and/or any other component(s) as described herein) may monitor a system voltage (or system voltage response) and/or a sinking current. For example, the monitoring and logging circuit 908 may monitor the system voltage ($V_{sys}$) 9112A at the system voltage node 9112 (as shown in FIG. 9) while the controlled current sink 906 incrementally increases the sinking current drawn from the system voltage node 9112 (as described above). In such examples, the monitoring and logging circuit 908 may continuously and/or actively monitor the system voltage ($V_{sys}$) 9112A (e.g., using the ADC 920 and/or the like). In some examples, the monitoring and logging circuit 908 may continuously and/or actively monitor the sinking current (e.g., using the ADC 920 and/or the like). Additionally or alternatively, the controlled current sink 906 may continuously and/or actively monitor the sinking current (e.g., using the comparator 928 and/or the like). In other examples, the CFSM 904 may determine a sinking current based at least in part on a sinking current increment of the instant iteration. For example, the sinking current value may be known (or predefined) by the CFSM 904 (e.g., in the Refdac<6:1> code of the register(s) 924 or any other program code instructions described herein). In some examples, the operation 1106 may be performed in one or more iterations (e.g., in conjunction with operation 1104 as described above and/or operation 1108 as described below). In some examples, the operation 1106 may, at least in part, occur during (or coincide with) the time intervals described above for operation 1104 and shown in FIG. 12.

The characterization finite state routine 1100 may continue at operation 1108, at which the CFSM 904 (and/or any other component(s) as described herein) may log (or record) a system voltage (or system voltage response) and/or a sinking current (or sinking current increment value). For example, the monitoring and logging circuit 908 may log, store, or record the system voltage ($V_{sys}$) 9112A while the controlled current sink 906 is held at a sinking current increment (e.g., any of sinking current increments 1208A-1208E). In some examples, the monitoring and logging circuit 908 may log, store, or record a system voltage response (or a drop in the system voltage ($V_{sys}$) 9112A) corresponding to a respective sinking current increment. For example, as shown in FIG. 12, when the sinking current is held at the sinking current increment 1208C (as shown in the sinking current graph 1206 between $T'_5$ and $T'_6$), then the system voltage ($V_{sys}$) 9112A drops (as represented by the system voltage response 1204C shown in the voltage graph 1202 between $T'_5$ and $T'_6$). In some examples, the monitoring and logging circuit 908 may log, store, or record an average voltage or system voltage response determined from a plurality of measurements (e.g., taken when the system voltage ($V_{sys}$) 9112A ceases (or stops) dropping, as indicated by the flattening of the system voltage line 1204 in FIG. 12). In some examples, the monitoring and logging circuit 908 may log, store, or record at least one sinking current value (e.g., to a memory device, to register(s) 922 using the ADC 920, and/or the like). Additionally or alternatively, the controlled current sink 906 may log, store, or record at least one sinking current value (e.g., to a memory device, to a register, and/or the like). In other examples, the CFSM 904 may determine a sinking current based at least in part on a sinking current increment of the instant iteration and the CFSM 904, may log, store, or record at least one sinking current increment value (e.g., to a memory device, to register(s) 922, and/or the like). In some examples, the operation 1108 may be performed in one or more iterations (e.g., in conjunction with operation 1104 and/or operation 1106 as described above). In some examples, the operation 1108 may, at least in part, occur during (or coincide with) the time intervals described above for operation 1104 and shown in FIG. 12.

As described above and illustrated in FIG. 11, the operations 1104-1108 may each be performed once or in any other number of iterations. For example, as shown in FIG. 12 and described herein the operations 1104-1108 may be performed for 5-iterations (or any other number), with each iteration corresponding to a respective time interval for each sinking current increment (e.g., each of sinking current increments 1208A-1208E). In some examples, the characterization finite state routine 1100 may repeat one or more of operations 1104-1108 until a final power limit corresponding to a final sinking current increment (e.g., sinking current increment 1208E) is reached and successfully maintained (e.g., without collapsing the system voltage ($V_{sys}$) 9112A as described herein). In some examples, a final sinking current increment may represent a final power target (e.g., the power limit sufficient to operate an electronic device at full performance levels without system throttling or the like). It should be appreciated that, in some such examples, the maximum power limit or capacity of the power source may further exceed the final power limit corresponding to the final sinking current increment. In some examples, the characterization finite state routine 1100 may repeat one or more of operations 1104-1108 until a maximum power limit (or capacity) is reached for a power source (e.g., USB port or the like). In such examples, the maximum power limit (or capacity) may be detected because the system voltage ($V_{sys}$) 9112A may collapse or drop below a minimum system voltage threshold, such as 3.6V or any other number.

The characterization finite state routine 1100 may continue at operation 1110, at which the CFSM 904 (and/or any other component(s) as described herein) may transmit a done signal. For example, as shown in FIG. 9, the CFSM 904 may generate and/or transmit a done signal 904B to the FSM 902 in order to cease or stop the characterization state routine 1100. In some examples, the operation 1110 may, at least in part, occur at (or coincide with) any time marker indicating completion a final sinking current increment (e.g., $T'_{10}$ as shown in the illustrated example of FIG. 12).

Now that an example characterization finite state machine block diagram for characterizing a power source for an electronic device comprising the power characterization circuit 900 has been described above with reference to FIGS. 11-12, the example waveform graphs 1200 representative of system voltage and sinking current during an example characterization state routine will now be described below in detail with further reference to FIG. 12.

FIG. 12 illustrates example waveforms for system voltage and sinking current during an example characterization state routine (e.g., characterization state routine 1100), in accordance with various aspects of the present disclosure. As shown, FIG. 12 illustrates a plurality of waveform graphs 1200. The waveform graphs 1200 are examples of a system voltage graph 1202 and a sinking current graph 1206 (or a controlled current graph). As shown, the system voltage graph 1202 and the sinking current graph 1206 are each representative of a respective waveform of the power characterization circuit 900 (and/or the control circuit 100) during the same time interval (between $T'_0$ to $T'_f$) for a non-limiting example implementation and/or use-case scenario.

It will be understood that the time markers from $T'_0$ to $T'_f$ (or any other time markers described herein) may represent any example length of time (e.g., 1 second, 5 seconds, 3 minutes, etc.). Further, the illustrated time markers (e.g., between $T'_0$ and $T'_f$ and/or the like) are positioned for illustrative purposes and to facilitate clearer description of the example graphical scenarios. Accordingly, the time markers should not be interpreted as representing the passage of a single amount of time unless specifically stated otherwise for a given example or otherwise understood within the context of a given example. For example, the time elapsed between $T'_0$ and $T'_1$ should not be interpreted to represent 1 second (or any other number) unless specifically stated otherwise, or otherwise understood within the context as used.

The system voltage graph 1202, as shown, comprises a Y-axis 1202Y and an X-axis 1202X. The Y-axis 1202Y, as shown, represents an amplitude of a voltage signal (e.g., indicating the system voltage ($V_{sys}$) 9112A), such as in Volts. The X-axis 1202X, as shown, represents a time interval (or period), such as in seconds or any other unit of time. As shown, the X-axis 1202X begins at $T'_0$ and ends at $T'_f$. The system voltage graph 1202, as shown, may further comprise a minimum system threshold 1202A and a system voltage line 1204.

The minimum system threshold 1202A, as shown, may represent (or indicate) the minimum voltage (and/or power) necessary to operate an electronic device (e.g., electronic device 700) at its lowest performance levels. The minimum system threshold 1202A may be predefined to 3.6V or any other number (e.g., based on the model and/or power requirements of a streaming stick and/or any other electronic device 700).

The system voltage line 1204, as shown, may represent (or indicate) the system voltage ($V_{sys}$) 9112A (e.g., of power characterization circuit 900 or the like) at any given time between $T'_0$ and $T'_f$. As shown, the system voltage line 1204 may comprise at least one system voltage response (e.g., any or all of system voltage responses 1204A-1204E). A respective system voltage response (e.g., any or all of system voltage responses 1204A-1204E) may correspond with (and/or result from) a respective increase in the sinking current (e.g., any or all of sinking current increments 1208A-1208E as shown in the sinking current graph 1206 and described below). For example, as the sinking current line 1208 increases to sinking current increment 1208D (as shown in the sinking current graph 1206), the system voltage line 1204 decreases to the system voltage response 1204D. It will be understood that, in the depicted example, the system voltage responses 1204A-1204E correspond to the sinking current increments 1208A-1208E respectively. Still other system voltage responses and/or system voltage responses (not shown) may be possible, in accordance with the desired implementation.

The sinking current graph 1206, as shown, comprises a Y-axis 1206Y and an X-axis 1206X. The Y-axis 1206Y, as shown, represents an amplitude of a current signal (e.g., indicating a sinking current caused by the controlled current sink 906 or another controlled system load), such as in Amperes. The X-axis 1206X, as shown, represents a time interval (or period), such as in seconds or any other unit of time. As shown, the X-axis 1206X begins at $T'_0$ and ends at $T'_f$. The sinking current graph 1206, as shown, may further comprise a sinking current line 1208.

The sinking current line 1208, as shown, may represent (or indicate) a sinking current (e.g., caused (or generated) by the controlled current sink 906 of power characterization circuit 900 and/or by any other controlled system load) at any given time between $T'_0$ and $T'_f$. As shown, the sinking current line 1208 may comprise at least one sinking current increment (e.g., any or all of sinking current increments 1208A-1208E). A respective sinking current increment (e.g., any or all of sinking current increments 1208A-1208E) may correspond with (and/or result from) a respective increase in the sinking current initiated during the operation 1104 of the characterization state routine 1100 (shown in FIG. 11). It should be understood that the increase in the sinking current drawing from the system voltage node 9112 by the controlled current sink 906 (or another load) may result in a decrease in the measured voltage at the system voltage node 9112 (i.e., a decrease in the system voltage ($V_{sys}$) 9112A). In some examples, the magnitude of the increase in the sinking current may affect the magnitude of the system voltage response (or drop). For instance, as shown in the depicted example, the magnitude of the increase in the sinking current is relatively small during sinking current increment 1208A (as shown in the sinking current graph 1206) and the corresponding magnitude of the decrease in the system voltage during the system voltage response 1204A (as shown in the system voltage graph 1202) is also relatively small. Additionally or alternatively, the magnitude of the increase in the sinking current is relatively large during sinking current increment 1208D and the corresponding magnitude of the decrease in the system voltage during the system voltage response 1204D is also relatively large.

In the non-limiting depicted examples of FIG. 12, each respective sinking current increment and its respective system voltage response correspond to the same respective time interval for illustrative purposes and to facilitate clearer description of the examples. It will be understood that, in some examples, a system voltage response may lag behind the sinking current increment. For instance, in some examples, sinking current increment 1208B may start at $T'_3$ and ends at $T'_4$ but the system voltage response 1204B may start sometime after $T'_3$ and may end sometime after $T'_4$.

As described above, in some examples, the characterization finite state routine 1100 (shown in FIG. 11) may repeat one or more of operations 1104-1108 until a final power limit corresponding to a final sinking current increment is reached and successfully maintained. In the depicted example shown in FIG. 12, the sinking current increment 1208E represents the final sinking current increment which may correspond to a final power limit representing the maximum power needed to operate an electronic device (e.g., electronic device 700) at full performance levels. In the depicted example of FIG. 12, the sinking current increment 1208E creates a larger system load than the maximum power limit of the power source (e.g., the USB port being tested by the characterization finite state routine 1100) can handle. As a result, the system voltage response 1204E, as shown at time marker $T'_C$, collapses (or drops) below the minimum system threshold 1202A. In some such examples, if the voltage collapses (or drops) below the minimum system threshold 1202A then this may be detected by the power characterization circuit 900 and the sinking current increment may end to prevent a system brownout. As shown at time marker $T'_C$, the sinking current line 1208 begins to reduce when the voltage collapses (or drops) below the minimum system threshold 1202A. It will be understood that, in some examples, there may be a delay (e.g., milliseconds, seconds, etc.) between when the voltage collapses (or drops) below the minimum system threshold 1202A and when the sinking current begins to reduce. In the depicted example, it should be understood that, because the system voltage response 1204E collapsed below the minimum system threshold 1202A, the last successful sinking current increment and system voltage response were sinking current increment 1208D and system voltage response 1204D. In such examples, multiplying the current value of the sinking current increment 1208D (e.g., 0.8A or any other number) by the voltage value of the system voltage response 1204D (e.g., 5V or any other number) would yield the maximum power limit (or capacity) for the power source (e.g., 4.0 W or any other number based on the current and voltage values).

In the depicted example shown in FIG. 12, the sinking current increment 1208A represents the first sinking current increment which may correspond to a minimum power limit representing the minimum power needed to operate an electronic device (e.g., electronic device 700) at its lowest performance levels (i.e., a maximum system throttling configuration that allows for basic system performance). In some examples, if the sinking current increment 1208A creates a larger system load than the maximum power limit of the power source can handle (e.g., the system voltage response 1204A collapses below the minimum system threshold 1202A) than the maximum power limit of the power source may be characterized as too low for even basic system performance (or any other use-case). Examples where a power source (e.g., USB Port, etc.) may be characterized as too low for even basic system performance (or any other use-case) are described in further detail below in connection with at least operation 1318 of FIG. 13.

It will be understood that each of the sinking current increments 1208A-1208E may be predefined, set, or configured to test for a particular USB specification (e.g., USB type and standard. For example, the sinking current increment 1208B may be predefined to increase the sinking current to 0.5A in order to test for the USB 2.0 standard which may correspond with a maximum power limit of 2.5 W or 5V at 0.5A. Additionally or alternatively, for example, the sinking current increment 1208D may be predefined to increase the sinking current to 1.5A in order to test for the USB 3.2 Gen 1 standard which may correspond with a maximum power limit of 4.5 W or 5V at 0.9A. In some examples, the final power target (e.g., the power limit sufficient to operate an electronic device at full performance levels without system throttling or the like) may be predefined as 5 W (or any other number) and may be tested for during the final sinking current increment (e.g., sinking current increment 1208E as shown in the depicted example). In some such examples, the final sinking current increment may be 1.0A (to within a ±10% tolerance or any other number) and the power source (e.g., USB port, etc.) voltage may be 5V (to within a ±10% tolerance or any other number). In other examples, the power characterization circuit 900 (or the like) may increase the sinking current in smaller discrete increments. For example, the sinking current increments may be small evenly spaced steps, such as 0.1A, 0.2A, 0.3A, etc., up to 1.5A or another final sinking current increment (e.g., corresponding to full system performance). Still other sinking current increment values may be predefined (e.g., in the firmware, software, and/or hardware of the power characterization circuit 900 shown in FIG. 9) to test for other maximum power limits.

Now that the example waveform graphs 1200 representative of system voltage and sinking current during an example characterization state routine have been described above with reference to FIGS. 11-12, an example process for booting an electronic device and characterizing a power source will now be described below with reference to FIG. 13.

Figure 13:
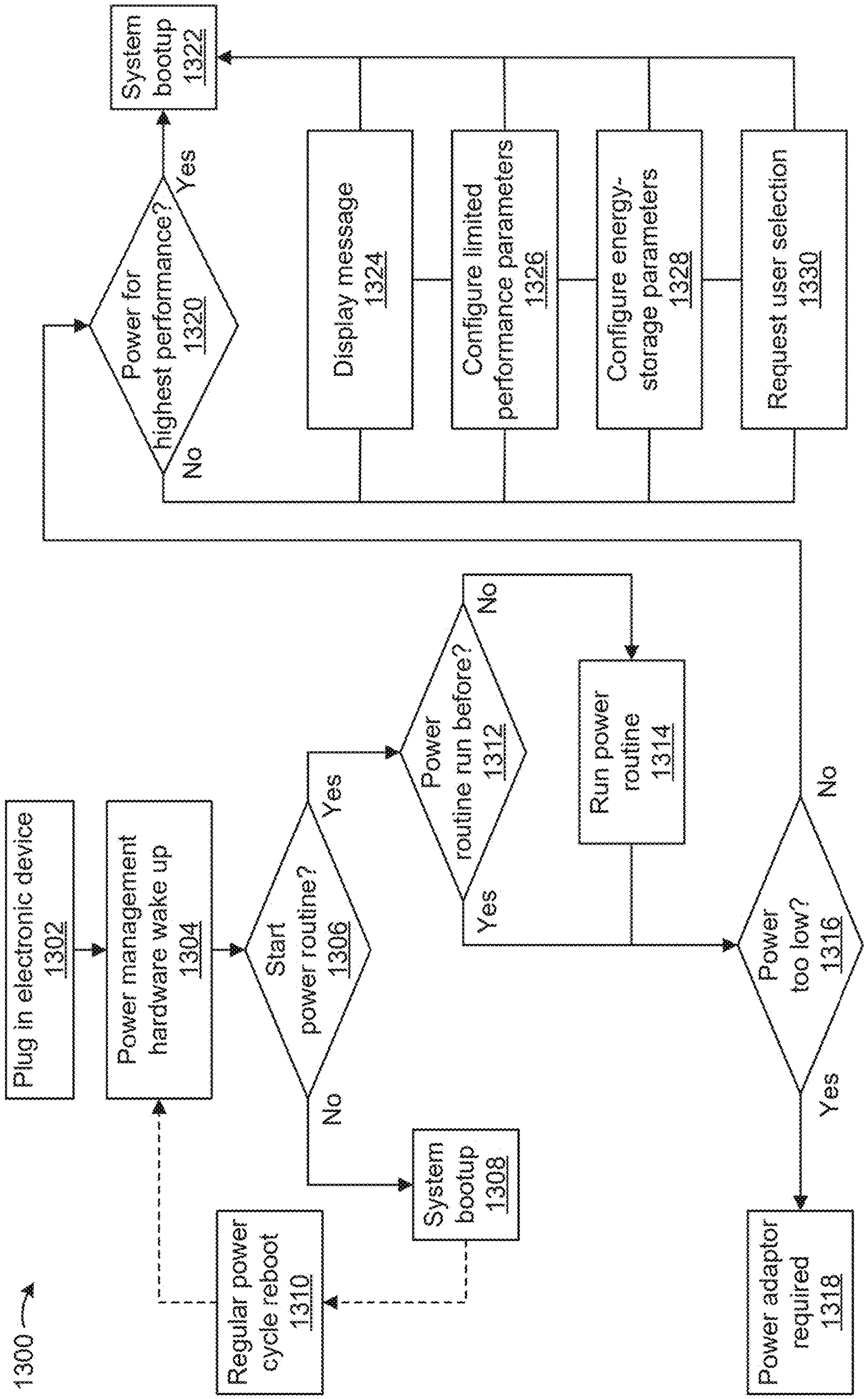
FIG. 13 illustrates an example process for booting an electronic device and characterizing a power source, in accordance with various aspects of the present disclosure.

FIG. 13 illustrates an example process for booting an electronic device and characterizing a power source, in accordance with various aspects of the present disclosure. As shown, the process 1300 may be used to characterize the maximum power limit of a power source (e.g., USB interface 104 or the like). The operations of the process 1300 may represent a series of instructions comprising computer readable machine code executable by a processing unit (e.g., processor(s) 702) of one or more computing devices described herein (e.g., electronic device 700, control circuit 100, and/or power characterization circuit 900), although various operations may also be implemented in, or using, hardware (e.g., monitoring and logging circuit 908, controlled current sink 906, and/or the like of electronic device 700, control circuit 100, and/or power characterization circuit 900). In some examples, the computer readable machine codes may be comprised of instructions selected from a native instruction set of at least one processor and/or an operating system of the electronic device. In some examples, the process 1300 may be performed, at least in part, by one or more components of electronic device 700, control circuit 100, and/or power characterization circuit 900.

As shown in FIG. 13, the process 1300 may begin at operation 1302, at which the electronic device 700 (or the like as described herein) may be plugged (e.g., by a user) into a power source. For example, a user may plug a USB connector of a smart television streaming stick into a USB port of a television. In some examples, the streaming stick may draw electrical power and/or transfer data with the host television. In some examples, the USB connector and/or the USB port may conform to any USB specification (e.g., USB 3.2, USB Type-A, etc.). In some examples, the USB connector and/or the USB port may be of the same USB specification. In other examples, the USB connector and/or the USB port may be of different (compatible) USB specifications (e.g., USB 3.2 Type-A and USB 2.0 Type-A, etc.). In some examples, the operation 1302 may include receiving a power signal from the powers source. In some such examples, the power signal causes a system voltage at a system voltage node of the electronic device. In some examples, the operation 1302 may comprise, at least in part, the operation 1002 described above in connection with FIG. 10.

The process 1300 may continue at operation 1304, at which the electronic device 700 (or the like as described herein) may initialize and/or wake up any or all power management hardware. For example, the PMIC 9108 (and/or the like as described herein) may wake up or activate and initialize a One-Time-Programmable (OTP) loading state (e.g., from Programmable Read Only Memory (PROM), One-Time-Programmable Memory (OTP), or the like) programmed to run or execute one or more operations (e.g., described below in connection with operations 1306, operation 1312, operation 1314, and/or the like) prior to the full system bootup (e.g., at operation 1308 or operation 1322). In some examples, the power management hardware (e.g., any or all components of power characterization circuit 900 and/or control circuit 100) may wake up in response to the electronic device being plugged in (and receiving power) and/or in response to a user input through a user interface (e.g., pressing a power button on a remote control associated with a streaming stick). In some examples, the operation 1304 may include initiating a power characterization circuit of the electronic device. In some examples, the operation 1304 may comprise, at least in part, the operation 1004 described above in connection with FIG. 10.

The process 1300 may continue at operation 1306, at which the electronic device 700 (or the like as described herein) may determine whether to start a power routine (e.g., characterization state routine 1100 or the like as described herein). For example, if a streaming stick was disconnected from a USB port of a television, then the streaming stick may lose power and/or any previously stored results (e.g., stored maximum power limit, power capacity, etc.) of a previous characterization state routine. Additionally or alternatively, if the streaming stick was connected to a television for the first time, the streaming stick may not have any previously stored results of a previous characterization state routine for that particular television (e.g., even if other results are accessible, such as in memory 704 or the like). In such examples, the power management hardware (e.g., any or all components of power characterization circuit 900, control circuit 100, and/or the like) may determine that, “Yes,” a characterization state routine (e.g., characterization state routine 1100) should be performed to determine a maximum power limit or power capacity (e.g., for the USB port of the television). In such examples, the process 1300 may proceed to operation 1312.

As further shown at operation 1306, in some examples, previously stored results of a previous characterization state routine may be accessible (e.g., from memory 704 or the like) for the current power source. In such examples, the electronic device 700 (or the like as described herein) may use the stored results and/or any corresponding system configurations (e.g., for minimum/basic, limited/throttled, or full system performance). In such examples, the power management hardware (e.g., any or all components of power characterization circuit 900, control circuit 100, and/or the like) may determine that, "No," a characterization state routine (e.g., characterization state routine 1100) should not be performed (e.g., for the USB port of the television). In such examples, the process 1300 may proceed to operation 1308.

As further shown at operation 1306, in some examples, the power management hardware may determine to run the characterization state routine based on a number of system reboots and/or bootups (e.g., 1, 3, 10, or any other number). In some examples, the power management hardware may determine to run the characterization state routine based on an amount of time (e.g., 24-hours, 5-days, 1-month, or any other amount of time) since the characterization state routine was last performed. In some such examples, the process 1300 may proceed to operation 1312. In other such examples, the process 1300 may skip operation 1312 and proceed to operation 1314. In some examples, the operation 1306 may comprise, at least in part, the operation 1006 described above in connection with FIG. 10.

The process 1300 may continue at operation 1308, at which the electronic device 700 (or the like as described herein) may initiate one or more system bootup procedures. For example, a streaming stick may bootup any firmware and/or software (e.g., an operating system, stored system performance parameters or configurations, etc.) and/or present the user with a home screen (or any other user interface) on the television screen. In some examples, the operation 1308 may include performing any or all functions associated with the electronic device 700 (i.e., operating with unrestricted parameters for full system performance). For example, a streaming stick may access streaming services and stream videos, music, or the like to the television without any system throttling (or limiting/throttling parameters or configurations). In other examples, such as when a previous characterization state routine characterized the power source for limited performance parameters (e.g., minimum/basic or limited/throttled system performance), the operation 1308 may include performing only some functions associated with the electronic device 700. For example, a streaming stick configured for minimum/basic or limited/throttled system performance may only be able to stream low definition videos, music, or the like to the television. In such examples, the system performance of the streaming stick may be restricted to less than full performance in order to reduce the system loading power and/or to operate within the maximum power limit of the USB device. In some examples, the operation 1308 may comprise, at least in part, the operation 1010 described above in connection with FIG. 10. In some examples, the operation 1308 may comprise, at least in part, the operation 1322 as described below.

In some examples, operation 1308 may further include retrieving stored results (e.g., power limit, power capacity, etc.) for a previous characterization state routine from memory (e.g., memory 704, register(s) 922, and/or the like). In some examples, the stored results for a previous characterization state routine may comprise a characterization profile for a power source and/or host device, such as a television. In some examples, the characterization profile may comprise at least one of a maximum power limit value, a power source identifier (e.g., USB specification, television serial number, etc.), a system performance parameter (e.g., 80% CPU throttling, 50% GPU throttling, deactivate Bluetooth circuit, etc.), and/or the like as described herein. In some examples, the characterization profile may indicate that the maximum power limit is too low for even basic use case(s) and/or would require heavy system throttling that the electronic device 700 could not function.

The process 1300 may continue at operation 1310, at which the electronic device 700 (or the like as described herein) may perform a regular power cycle reboot. For example, a user may at least temporarily turn off the power to the television or the streaming stick causing the streaming stick to reboot when the power is turned back on. In some examples, the streaming stick may reboot due to a loss of power during operation. In such examples, the process 1300 may repeat operations 1304 and/or 1306 as described above and, in some such examples, may determine to run (or rerun) a characterization state routine to detect the maximum power limit of the USB port and/or to reconfigure the system performance parameters for the streaming stick. In such examples, the process 1300 may proceed to operation 1312. In some examples, the operation 1310 may comprise, at least in part, the operation 1010 described above in connection with FIG. 10.

The process 1300 may continue at operation 1312, at which the electronic device 700 (or the like as described herein) may determine whether a power routine (e.g., characterization state routine 1100 or the like as described herein) was previously performed. In some examples, operation 1312 may further include retrieving stored results for a previous characterization state routine from memory (e.g., memory 704, register(s) 922, and/or the like). In some such examples, the stored results for a previous characterization state routine may comprise a characterization profile as described herein. In such examples, the power management hardware (e.g., any or all components of power characterization circuit 900, control circuit 100, and/or the like) may determine that, "Yes," a characterization state routine (e.g., characterization state routine 1100) was previously performed. In such examples, the process 1300 may proceed to operation 1316. In some examples, operation 1312 may further include failing to retrieve stored results for a previous characterization state routine from memory (e.g., memory 704, register(s) 922, and/or the like). In such examples, the power management hardware (e.g., any or all components of power characterization circuit 900, control circuit 100, and/or the like) may determine that, "No," a characterization state routine (e.g., characterization state routine 1100) was not previously performed. In such examples, the process 1300 may proceed to operation 1314. It should be understood that, in some examples, a characterization state routine may have been previously performed but the stored results may have been erased from memory (e.g., memory 704, register(s) 922, and/or the like) due to a brown-out or other circumstances that may wipe a memory device. As described above at the operation 1306, in some examples, the power management hardware may determine to run a characterization state routine based on a number of system reboots and/or bootups (e.g., 1, 3, 10, or any other number) and/or based on an amount of time (e.g., 24-hours, 5-days, 1-month, or any other amount of time) since the last characterization state routine was performed. In some such examples, the process 1300 may skip operation 1312 and the operation 1306 may proceed to operation 1314. In some examples, the operation 1312 may comprise, at least in part, the operation 1006 described above in connection with FIG. 10.

The process 1300 may continue at operation 1314, at which the electronic device 700 (or the like as described herein) may run a characterization state routine (e.g., characterization state routine 1100 described above in connection with at least FIGS. 11-12) to determine a maximum power limit for a power source. For example, a streaming stick (equipped with at least power characterization circuit 900) may incrementally increase a sinking current as described above and illustrated in the sinking current graph 1206 of FIG. 12 until either a final power target is reached (e.g., it is determined that the USB port can maintain 5 W or any other power target) and/or a sinking current increment causes the input voltage from the USB port to collapse below a minimum system threshold (e.g., minimum system threshold 1202A shown in the sinking current graph 1206 of FIG. 12). In some examples, the operation 1314 may comprise, at least in part, the operation 1008 described above in connection with FIG. 10. In some examples, the operation 1314 may comprise, at least in part, the characterization state routine 1100 described above in connection with FIGS. 11-12.

In some examples, the operation 1314 may include setting a sinking current to a base value and/or setting the sinking current to one or more increments. In some such example, the operation 1314 may include holding the sinking current at each of the one or more increments for a predefined time and/or resetting the sinking current to the base value after each of the one or more increments (and/or after a predefined time elapses). In some examples, the operation 1314 may include monitoring and/or recording the sinking current at each of the one or more increments. In some examples, the operation 1314 may include monitoring and/or recording the system voltage at each of the one or more increments. In some such examples, the operation 1314 may include measuring at least one of the sinking current or the system voltage and/or mapping at least one of the sinking current or the system voltage to a respective increment of the one or more increments. In some examples, the operation 1314 may include determining a power value at each of the one or more increments and/or recording a maximum power value for the power source.

In some examples, the operation 1314 may include comparing the system voltage to a voltage threshold. In some such examples, the operation 1314 may include determining that the system voltage is equal to, or less than, the voltage threshold. In some such examples, the operation 1314 may include shutting off the sinking current when the system voltage is equal to, or less than, a voltage threshold. In some examples, the operation 1314 may include determining a respective power value of at least one of the one or more increments is equal to, or greater than, a maximum power threshold (or final power target). In some such examples, the operation 1314 may include recording the respective power value as the maximum power value and/or characterizing the power source for full performance (or the highest performance use case(s) for the electronic device). In some examples, the operation 1314 may include determining that a respective system voltage of at least one of the one or more increments is equal to, or less than, a voltage threshold. In some such examples, the operation 1314 may include recording a previous successful power value as the maximum power value and/or performing one or more reactive corrective actions (as described herein).

The process 1300 may continue at operation 1316, at which the electronic device 700 (or the like as described herein) may determine whether the maximum power limit of a power source is too low for basic use case(s) (or any and all system performance). In some examples, the operation 1316 may include comparing the maximum power limit (determined by a characterization state routine) to a minimum or basic power limit (e.g., required for basic system performance). In some examples, the minimum or basic power limit may be predefined for an electronic device, such as during manufacture, and/or may be determined by laboratory testing (and/or the like).

If the maximum power limit is too low (i.e., the USB port cannot support basic streaming stick use case(s)), then the power management hardware (e.g., any or all components of power characterization circuit 900, control circuit 100, and/or the like) may determine that, "Yes," the maximum power limit is too low. In some such examples, the power management hardware may further determine that limited performance parameters would not be sufficient to compensate for the deficiencies of the maximum power limit. In such examples, the process 1300 may proceed to operation 1318.

If the maximum power limit is not too low (i.e., the USB port can support at least basic streaming stick use case(s)), then the power management hardware (e.g., any or all components of power characterization circuit 900, control circuit 100, and/or the like) may determine that, "No," the maximum power limit is not too low. In such examples, the process 1300 may proceed to operation 1320.

The process 1300 may continue at operation 1318, at which the electronic device 700 (or the like as described herein) may alert a user that a power adapter is required. For example, a streaming stick, using a bootloader (or the like) may display a message on the television screen indicating that a power adapter is required and/or that the user may retest another USB port of the television. It will be understood that some televisions and other devices using USB ports may include USB ports of different specifications and, thus, a different USB port on the same device may have a different maximum power limit. In some examples, the operation 1318 may include preventing (or blocking) a full system bootup routine from running (or executing). In some examples, the process 1300 may be repeated, at least in part, with another USB port of the same television. In some examples, the process 1300 may end at the operation 1318. In some examples, the operation 1318 may include characterizing the power source as an insufficient power source, generating a message signal indicating that a power-adaptor is required, and/or generating a no-bootup signal preventing system bootup.

The process 1300 may continue at operation 1320, at which the electronic device 700 (or the like as described herein) may determine whether the maximum power limit of a power source is sufficient for the highest performance use case(s) (e.g., full system performance without the need for system throttling or the like). In some examples, the operation 1320 may include comparing the maximum power limit (determined by a characterization state routine) to a final power target (e.g., the power limit sufficient to operate an electronic device for the highest performance use case(s) without system throttling or the like). In some examples, the final power target may be predefined for an electronic device, such as during manufacture, and/or may be determined by laboratory testing (and/or the like).

If the maximum power limit is equal to, or greater than, final power target of the electronic device, then the power management hardware (e.g., any or all components of power characterization circuit 900, control circuit 100, and/or the like) may determine that, "Yes," the maximum power limit is sufficient for the highest performance use case(s). In such examples, the process 1300 may proceed to operation 1322. In some examples, the power management hardware may further configure (and record to a memory device or register(s)) a characterization profile for the power source (e.g., USB port) comprising at least one of the maximum power limit value, a power source identifier (e.g., USB specification, television serial number, etc.), a system performance parameter (e.g., 100% CPU throttling, 100% GPU throttling, no system module deactivation, etc.), an indicator indicating full system performance, and/or the like as described herein.

If the maximum power limit is less than, final power target of the electronic device, then the power management hardware (e.g., any or all components of power characterization circuit 900, control circuit 100, and/or the like) may determine that, "No," the maximum power limit is not sufficient for the highest performance use case(s). In such examples, the process 1300 may proceed to at least one of operation 1324, operation 1326, operation 1328, and/or operation 1330. In some such examples, the power management hardware may further configure (and record to a memory device or register(s)) a characterization profile for the power source (e.g., USB port) comprising at least one of the maximum power limit value, a power source identifier (e.g., USB specification, television serial number, etc.), a system performance parameter (e.g., 90% CPU throttling, 95% GPU throttling, at least temporary Bluetooth and/or Wi-Fi circuit deactivation, etc.), and/or the like as described herein. It will be understood that operation 1324, operation 1326, operation 1328, and/or operation 1330 may represent example reactive corrective actions and, in some examples, may include some or all of the reactive corrective actions described above in connection with FIG. 3.

The process 1300 may continue at operation 1322, at which the electronic device 700 (or the like as described herein) may initiate one or more system bootup procedures. For example, a streaming stick may bootup any firmware and/or software (e.g., an operating system, characterization profile for the power source, stored system performance parameters or configurations, etc.) and/or present the user with a home screen, a message, and/or any other graphical user interface described herein on the television screen. In some examples, the operation 1308 may include performing any and/or all functions associated with the electronic device 700 (e.g., operating with unrestricted parameters for full system performance, operating with limited or restricted parameters for limited or basic system performance, etc.). In some examples, the operation 1322 may include generating a system bootup signal indicating minimum, limited, or full performance. In some examples, the operation 1322 may comprise, at least in part, the operation 1010 described above in connection with FIG. 10. In some examples, the operation 1322 may comprise, at least in part, the operation 1308 as described above.

The process 1300 may continue at operation 1324, at which the electronic device 700 (or the like as described herein) may display a message (as described herein). In some examples, the electronic device may proceed with a full performance system bootup, without throttling and/or restrictions, even if the power source is not sufficient for the highest performance use-case(s). In such examples, the electronic device may display a message (e.g., an alarm message) on the television screen indicating to the user that there is a risk of a system brown-out and/or reboot (e.g., due to transient power peaks and limited power from a USB port or the like). In some such examples, the user may provide a user input (e.g., via remote control, etc.) accepting the risk of brown-out and/or reboot. In such examples, the process 1300 may proceed to operation 1322. In other examples, the user may provide a user input (e.g., via remote control, etc.) declining the risk of brown-out and/or reboot and accepting limited system performance to reduce the system loading power (e.g., reducing or eliminating the risk of brown-out and/or reboot due to transient power peaks). In such examples, the process 1300 may proceed to operation 1326. In some examples, the operation 1324 may include characterizing the power source as a minimum or limited performance power source, generating a message signal indicating a risk of brownout, and/or generating a message signal indicating minimum or limited performance. In some examples, the process 1300 may proceed to operation 1330.

The process 1300 may continue at operation 1326, at which the electronic device 700 (or the like as described herein) may configure one or more limited performance parameters (as described herein). In some examples, the electronic device may proceed with a minimum or limited performance system bootup, with throttling and/or restrictions. In some examples, the operation 1326 may include characterizing the power source as a minimum or limited performance power source and/or configuring one or more parameters as a minimum or limited performance parameter. In such examples, the process 1300 may proceed to operation 1322. In some examples, the power management hardware (e.g., any or all components of power characterization circuit 900, control circuit 100, and/or the like) may determine, based on the characterization profile (or the like), that additional energy-storage and/or system power and performance control techniques (as described above in connection with FIGS. 1-8) are necessary for (and/or would be beneficial to) the operation of the electronic device. For example, the power management hardware may determine that a USB port can power a streaming stick with minimum system performance with system throttling alone because the maximum power limit of the USB port is equal to (e.g., to within a ±10% tolerance) the minimum system performance parameters. Additionally or alternatively, the power management hardware may determine that with additional energy-storage capabilities (e.g., using high-voltage capacitor 116 as shown in FIG. 1 and/or the like as described herein) and/or system power and performance control techniques (e.g., the power based dynamic current control profile 400 represented by the power control graph 402 as shown in FIG. 4 and/or the like as described herein), the USB port can power the streaming stick with full (or less limited) system performance. In such examples, the process 1300 may proceed to operation 1328. In some examples, the process 1300 may proceed to operation 1330.

The process 1300 may continue at operation 1328, at which the electronic device 700 (or the like as described herein) may configure one or more energy storage parameters (as described herein). For example, the power management hardware (e.g., any or all components of power characterization circuit 900, control circuit 100, and/or the like) may set the maximum power limit 202A of the system loading power graph 202 (shown in FIG. 2) (and/or any other parameters required to implement the power based dynamic current control profile 400) equal to the maximum power limit for the power source that was determined at operation 1314 as described above. In some examples, the operation 1328 may include activating one or more energy storage devices as described herein. For example, the power management hardware may activate, at least in part, the control circuit 100 in order to begin charging the high-voltage capacitor 116 (or the like). In such examples, the power management hardware may control the charging and/or discharging of the high-voltage capacitor 116 (or the like), as described above in connection with at least FIGS. 2 and 8, using the power based dynamic current control profile 400 (represented by the power control graph 402 as shown in FIG. 4). It will be understood that the power management hardware may continue to perform one or more operations described above in connection with FIGS. 1-8 after the system bootup operations described above at operation 1322. For example, the power management hardware (e.g., PMIC 108, SPC 102, etc.) may regulate (or throttle) power to at least one of a processor, memory, a Wi-Fi circuit, a Bluetooth circuit, and/or a graphics circuit of the smart television streaming stick and/or may discharge the high-voltage capacitor 116 during periods of high power usage (e.g., transient power peaks, such as power peak 204A and/or power peak 204B shown in FIG. 2). In some examples, the process 1300 may proceed to operation 1330 and/or operation 1322.

The process 1300 may continue at operation 1330, at which the electronic device 700 (or the like as described herein) may request that a user select one or more reactive corrective actions. In some examples, the power management hardware (e.g., any or all components of power characterization circuit 900, control circuit 100, and/or the like) may determine that one or more of the operations 1324-1328 (as described above) may be utilized to improve performance of the electronic device with a limited or minimal power source. In such examples, the electronic device may present multiple options (or combinations of options) to a user for selection. For example, a streaming stick, using a bootloader (or the like) may display a message to the user on a television screen asking the user to choose from a plurality of options before proceeding to operation 1322. In some such examples, the displayed message may request that a user select to (i) change to a power adaptor, (ii) degrade or throttle the system performance (e.g., in accordance with one or more throttling schemes as described herein), (iii) proceed without system throttling, (iv) acknowledge the risk of a system brown-out and/or reboot due to insufficient power, and/or (v) utilize an energy storage device and power based current control profile. For example, a user may choose (e.g., via a graphical user interface of the television) to throttle the system performance (e.g., reduce CPU and/or GPU performance to 75% capacity, etc.) and/or choose to utilize an energy storage device and power based current control profile. In some such examples, the process 1300 may proceed to operation 1322.

Various systems and processes described herein may include, or be implemented using, or in conjunction with, or for, a device or electronic device. A device or electronic device (e.g., electronic device 700 or the like as described herein) may be, for example, any electronic device equipped with a USB connector (e.g., including a USB cable) and/or any other fixed or limited power source (or supply). Further, a device or electronic device may be one or more of a streaming stick (e.g., Fire TV Stick), video camera (e.g., webcam), game console (e.g., video game USB stick), and/or similar electronic devices equipped with a USB connector (e.g., external Hard Disk Drive (HDD), external Solid State Drive (SSD), etc.), another fixed or limited power source (e.g., battery), and/or any other physical componentry necessary to perform the various operations described herein.

Various systems and processes described herein may include, or be implemented using, or in conjunction with, or for, an energy storage device. An energy storage device may be, for example, any component or device capable of, at least temporarily, storing electricity (e.g., electrical power, voltage, etc.). Further, an energy storage device may be one or more of a capacitor (e.g., high-voltage capacitor), a battery (e.g., rechargeable battery), and/or any other physical componentry necessary to perform the various energy storage operations (e.g., charging, discharging, etc.) described herein.

Various systems and processes described herein may be implemented by coupling two or more components. A couple, coupler, or coupling may be, for example, any connection between two or more components of one or more electronic devices. For example, an inductor circuit may be coupled to an energy storage device (e.g., a high-voltage capacitor, etc.) via a direct connection (e.g., by a wire and/or any other electrically conductive material) or an indirect connection (e.g., by one or more wires, any other electrically conductive material, and/or one or more other interceding components such as a switch). In some examples, a node of a circuit may couple (and/or be coupled to) two or more components of the circuit. For example, a system voltage node may, at least in part, couple (and/or be coupled to) a PMIC and a USB interface.

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A streaming media player [SMP device] comprising:
a processor;
memory;
a Wi-Fi circuit;
a Bluetooth circuit;
a graphics circuit;
a Universal Serial Bus (USB) interface configured to provide power to the SMP device, wherein the USB interface comprises a maximum power output; and
a control circuit comprising:
a system voltage node coupled to the USB interface, a System Power and Performance Control (SPC) circuit, an inductor, and a Power Management Integrated Circuit (PMIC),
the inductor coupling a high-voltage capacitor to the system voltage node, wherein the inductor is configured to regulate a current between the system voltage node and the high-voltage capacitor,
the high-voltage capacitor,
the PMIC configured to:
determine the maximum power output of the USB interface,
the SPC circuit configured to:
monitor a system loading power of the SMP device relative to the maximum power output of the USB interface,
monitor a system voltage of the system voltage node,
monitor a capacitor voltage of the high-voltage capacitor,
determine that the system loading power is greater than the maximum power output of the USB interface,
control the current through the inductor to discharge the high-voltage capacitor and provide additional system loading power to the system voltage node, wherein the additional system loading power comprises a difference between the system loading power and the maximum power output of the USB interface, wherein the current through the inductor is continuously adjusted based on a function of an instantaneous power-gap between the system loading power and the maximum power output,
determine that the capacitor voltage is less than a warning threshold, and
generate a warning signal that indicates (i) a potential power loss, and (ii) a minimum buffering time to perform a corrective action; and
the PMIC further configured to:
control power to the processor, the memory, the Wi-Fi circuit, the Bluetooth circuit, and the graphics circuit, and
perform the corrective action, wherein the corrective action comprises reducing power to at least one of the processor, the memory, the Wi-Fi circuit, the Bluetooth circuit, or the graphics circuit.

2. The SMP device of claim 1, wherein the SPC circuit is further configured to:
determine that the system loading power is less than the maximum power output of the USB interface;
control the current through the inductor to charge the high-voltage capacitor, wherein the current through the inductor to charge the high-voltage capacitor is continuously adjusted based on the function of the instantaneous power-gap between the system loading power and the maximum power output;
determine that the capacitor voltage is equal to, or greater than, a capacitor ready threshold;
generate a ready signal that indicates that the high-voltage capacitor is ready to discharge and provide the additional system loading power;
control the current through the inductor to charge the high-voltage capacitor above the capacitor ready threshold;
determine that the capacitor voltage is equal to a capacitor maximum threshold to within a 10% tolerance; and
control the current through the inductor to cease charging of the high-voltage capacitor and maintain the capacitor voltage at the capacitor maximum threshold to within the 10% tolerance.

3. The SMP device of claim 2, wherein the SPC circuit is further configured to:
determine that the capacitor voltage is less than an alarm threshold, and
generate an alarm signal that indicates (i) the high-voltage capacitor is depleted, (ii) the system voltage is decreasing, and (iii) a shutdown mode is required, and
wherein the PMIC is further configured to:
initiate the shutdown mode in response to the alarm signal, wherein the shutdown mode comprises shutting down the SMP device.

4. A streaming media player [SMP device] comprising:
one or more system modules;
a power source comprising a power limit; and
a control circuit comprising:
a system voltage node coupled to the power source and an inductor,
the inductor coupled to a capacitor,
a Power Management Integrated Circuit (PMIC) configured to:
detect the power limit for the power source, and
transfer power from the system voltage node to the one or more system modules; and
a System Power and Performance Control (SPC) circuit configured to:
monitor a system loading power of the SMP device relative to the power limit,
monitor a capacitor voltage of the capacitor,
determine that the system loading power is greater than the power limit, and
discharge the capacitor to provide additional power to the system voltage node, wherein the additional power is continuously adjusted based on a function of an instantaneous power-gap between the system loading power and the power limit.

5. The SMP device of claim 4, wherein the SPC circuit is further configured to:
determine that the capacitor voltage is less than a warning threshold; and
generate a warning signal that indicates (i) a potential power loss, and (ii) a minimum buffering time to perform a corrective action.

6. The SMP device of claim 5, wherein the PMIC is further configured to:

perform the corrective action comprising at least one of (i) displaying a warning message, (ii) reducing power to at least one of the one or more system modules, and (iii) shutting down at least one of the one or more system modules.

7. The SMP device of claim 4, wherein the SPC circuit is further configured to:

monitor a system voltage of the system voltage node;

determine that the capacitor voltage is less than an alarm threshold;

determine that the system voltage is decreasing; and generate an alarm signal that indicates (i) the capacitor is depleted, and (ii) the system voltage is decreasing.

8. The SMP device of claim 7, wherein the PMIC is further configured to:

initiate a shutdown mode comprising at least one of (i) displaying an alarm message, and (ii) shutting down the one or more system modules.

9. The SMP device of claim 4, wherein the SPC circuit is further configured to:

determine that the system loading power is less than the power limit; and charge the capacitor using excess power between the system loading power and the power limit, wherein the excess power is continuously adjusted based on the function of the instantaneous power-gap between the system loading power and the power limit.

10. The SMP device of claim 9, wherein the SPC circuit is further configured to:

determine that the capacitor voltage is equal to, or greater than, a capacitor ready threshold; and generate a ready signal that indicates that the capacitor is ready to provide the additional power.

11. The SMP device of claim 9, wherein the SPC circuit is further configured to:

determine that the capacitor voltage is equal to a capacitor maximum threshold to within a 10% tolerance; and cease charging of the capacitor and maintain the capacitor voltage at the capacitor maximum threshold to within the 10% tolerance.

12. A method comprising:

detecting, by a Power Management Integrated Circuit (PMIC) of a control circuit of a streaming media player [SMP device], a power limit for a power source of the SMP device;

transferring, by the PMIC, power from a system voltage node of the control circuit to one or more system modules of the SMP device, wherein the system voltage node is coupled to the power source and an inductor, and wherein the inductor is coupled to a capacitor;

monitoring, by a System Power and Performance Control (SPC) circuit of the control circuit, a system loading power of the SMP device relative to the power limit;

monitoring, by the SPC circuit, a capacitor voltage of the capacitor;

determining, by the SPC circuit, that the system loading power is greater than the power limit; and discharging, by the SPC circuit, the capacitor to provide additional power to the system voltage node, wherein the additional power is continuously adjusted based on a function of an instantaneous power-gap between the system loading power and the power limit.

13. The method of claim 12, comprising:

determining, by the SPC circuit, that the capacitor voltage is less than a warning threshold; and generating, by the SPC circuit, a warning signal that indicates (i) a potential power loss, and (ii) a minimum buffering time to perform a corrective action.

14. The method of claim 13, comprising:

performing, by the PMIC, the corrective action comprising at least one of (i) displaying a warning message, (ii) reducing power to at least one of the one or more system modules, and (iii) shutting down at least one of the one or more system modules.

15. The method of claim 12, comprising:

monitoring, by the SPC circuit, a system voltage of the system voltage node;

determining, by the SPC circuit, that the capacitor voltage is less than an alarm threshold;

determining, by the SPC circuit, that the system voltage is decreasing; and generating, by the SPC circuit, an alarm signal that indicates (i) the capacitor is depleted, and (ii) the system voltage is decreasing.

16. The method of claim 15, comprising:

initiating, by the PMIC, a shutdown mode comprising at least one of (i) displaying an alarm message, and (ii) shutting down the one or more system modules.

17. The method of claim 12, comprising:

determining, by the SPC circuit, that the system loading power is less than the power limit; and charging, by the SPC circuit, the capacitor using excess power between the system loading power and the power limit, wherein the excess power is continuously adjusted based on the function of the instantaneous power-gap between the system loading power and the power limit.

18. The method of claim 17, comprising:

determining, by the SPC circuit, that the capacitor voltage is equal to, or greater than, a capacitor ready threshold; and generating, by the SPC circuit, a ready signal that indicates that the capacitor is ready to provide the additional power.

19. The method of claim 17, comprising:

determining, by the SPC circuit, that the capacitor voltage is equal to a capacitor maximum threshold to within a 10% tolerance; and ceasing, by the SPC circuit, charging of the capacitor and maintaining the capacitor voltage at the capacitor maximum threshold to within the 10% tolerance.

20. The method of claim 12, comprising:

charging the capacitor, wherein the charging the capacitor comprises closing a switch when the capacitor voltage is less than a system voltage;

maintaining the capacitor voltage at a capacitor maximum threshold, to within a 10% tolerance, wherein the maintaining the capacitor voltage comprises opening the switch when the capacitor voltage is equal to the capacitor maximum threshold, to within the 10% tolerance; and wherein the discharging the capacitor comprises closing the switch when the system voltage is less than the capacitor voltage.

* * * * *